(12) United States Patent
Frost

(10) Patent No.: US 10,160,371 B2
(45) Date of Patent: Dec. 25, 2018

(54) VEHICLE RACK

(71) Applicant: Richard J. Frost, Calgary (CA)

(72) Inventor: Richard J. Frost, Calgary (CA)

(73) Assignee: Frost Contracting, INC., Cleveland, OH (US)

( * ) Notice: Subject to any disclaimer, the term of this patent is extended or adjusted under 35 U.S.C. 154(b) by 93 days.

(21) Appl. No.: 15/454,943

(22) Filed: Mar. 9, 2017

(65) Prior Publication Data

US 2017/0174115 A1    Jun. 22, 2017

Related U.S. Application Data

(63) Continuation-in-part of application No. 14/282,748, filed on May 20, 2014.

(51) Int. Cl.
| | | |
|---|---|---|
| B60R 9/042 | (2006.01) | |
| B60P 3/06 | (2006.01) | |
| B60P 1/43 | (2006.01) | |
| B60P 3/10 | (2006.01) | |
| B60R 9/08 | (2006.01) | |

(52) U.S. Cl.
CPC ............ B60P 3/06 (2013.01); B60P 1/435 (2013.01); B60P 3/1025 (2013.01); B60R 9/042 (2013.01); B60R 9/08 (2013.01); B60P 3/064 (2013.01); B60P 3/1091 (2013.01)

(58) Field of Classification Search
CPC .. B60P 1/43; B60P 1/433; B60P 1/435; B60P 1/4485; B60P 3/06; B60P 3/064; B60P 3/10; B60P 3/1008; B60P 3/1025; B60P 3/1066; B60P 3/1091; B60R 9/042; B60R 9/0426; B60R 9/08
See application file for complete search history.

(56) References Cited

U.S. PATENT DOCUMENTS

| | | | | |
|---|---|---|---|---|
| 2,765,940 | A * | 10/1956 | Nelson | B60P 3/1025 414/462 |
| 3,001,679 | A * | 9/1961 | Canning | B60P 3/1008 224/322 |
| 3,038,617 | A * | 6/1962 | Seegrist | B60P 3/1066 414/559 |
| 3,048,291 | A * | 8/1962 | Mabry | B60P 3/1025 414/462 |
| 3,077,998 | A * | 2/1963 | Balko | B60P 3/1066 414/538 |
| 3,091,208 | A * | 5/1963 | Copeland | B60F 3/0061 114/344 |
| 3,160,297 | A * | 12/1964 | Stunvoll | B60P 3/1066 414/532 |
| 3,170,583 | A | 2/1965 | Meyer | |

(Continued)

FOREIGN PATENT DOCUMENTS

| | | | | |
|---|---|---|---|---|
| CA | 2076255 | A1 * | 2/1994 | ............... B60P 1/43 |
| CA | 2079170 | A1 * | 3/1994 | ............. B60P 1/003 |

(Continued)

*Primary Examiner* — D Glenn Dayoan
*Assistant Examiner* — Melissa Black
(74) *Attorney, Agent, or Firm* — Kraig K. Anderson

(57) ABSTRACT

A vehicle rack for hauling one or more personal recreational vehicles is provided. A vehicle rack may be adjustable to allow one or more personal recreation vehicles to be stored above a vehicle's cargo area allowing the vehicle to also tow a trailer.

18 Claims, 16 Drawing Sheets

(56) References Cited

U.S. PATENT DOCUMENTS

| | | | | |
|---|---|---|---|---|
| 3,343,696 | A | * | 9/1967 | Morrison .............. B60P 3/1025 414/462 |
| 3,382,993 | A | * | 5/1968 | Bahrs .................. B60P 3/1025 414/462 |
| 3,411,644 | A | * | 11/1968 | Cook ...................... B60D 1/07 280/477 |
| 3,613,920 | A | * | 10/1971 | Flamm ..................... B60P 1/43 296/3 |
| 3,648,866 | A | * | 3/1972 | Slown ................. B60P 3/1025 414/462 |
| 3,708,081 | A | * | 1/1973 | Schladenhauffen .. B60P 3/1025 414/462 |
| 3,734,321 | A | * | 5/1973 | Long ..................... B60P 3/1025 224/310 |
| 3,877,594 | A | * | 4/1975 | Coakley ............... B60P 3/1025 414/462 |
| 3,927,779 | A | * | 12/1975 | Johnson ............... B60P 3/1025 414/462 |
| 3,972,433 | A | | 8/1976 | Reed |
| 3,976,213 | A | * | 8/1976 | Ball ..................... B60P 3/1025 414/462 |
| 4,212,580 | A | | 6/1980 | Fluck |
| 4,274,788 | A | * | 6/1981 | Sutton ................. B60P 3/1033 224/310 |
| 4,531,879 | A | * | 7/1985 | Horowitz ................. B60R 9/08 224/310 |
| 4,960,356 | A | | 10/1990 | Wrenn |
| 5,005,846 | A | | 4/1991 | Taylor |
| 5,069,595 | A | * | 12/1991 | Smith .................. B60P 3/1025 414/462 |
| 5,071,308 | A | * | 12/1991 | Tibbet .................. B60R 9/042 224/310 |
| 5,108,248 | A | | 4/1992 | Murrill |
| 5,184,914 | A | | 2/1993 | Basta |
| 5,249,545 | A | | 10/1993 | Gettman |
| 5,249,910 | A | | 10/1993 | Ball |
| 5,257,728 | A | | 11/1993 | Gibson |
| 5,431,525 | A | * | 7/1995 | Scott ...................... B60P 1/43 296/61 |
| 5,511,928 | A | * | 4/1996 | Ellis ..................... B60P 3/1025 114/344 |
| 5,542,810 | A | | 8/1996 | Florus |
| 5,553,762 | A | | 9/1996 | Brown |
| 5,603,600 | A | | 2/1997 | Egan |
| 5,609,462 | A | * | 3/1997 | Reimer ................. B60P 3/1025 224/310 |
| 5,620,296 | A | | 4/1997 | McMahon et al. |
| 5,810,546 | A | | 9/1998 | Schmoling |
| 5,882,170 | A | | 3/1999 | Walton |
| 5,897,284 | A | | 4/1999 | Ardohain |
| 5,934,863 | A | | 8/1999 | Beck |
| 5,961,139 | A | | 10/1999 | Nichols |
| 6,152,674 | A | * | 11/2000 | Ogrodnick ............ B60P 1/6463 414/491 |
| 6,210,096 | B1 | | 4/2001 | Fielder |
| 6,357,991 | B1 | | 3/2002 | Hamlett |
| 8,133,000 | B2 | * | 3/2012 | Olson ................... B60P 3/1025 224/310 |
| 8,371,427 | B1 | | 2/2013 | Miklos |
| 8,864,001 | B2 | * | 10/2014 | Langseder ............. B60R 5/041 224/405 |
| 9,017,004 | B1 | * | 4/2015 | Brown, Jr. ............. B60P 1/435 414/537 |
| 2005/0111945 | A1 | | 5/2005 | Miller |
| 2006/0182573 | A1 | * | 8/2006 | Taylor ...................... B60P 1/02 414/477 |
| 2007/0177964 | A1 | | 8/2007 | Bosela |
| 2008/0008528 | A1 | * | 1/2008 | Hey ......................... B63C 3/06 405/3 |
| 2008/0019812 | A1 | | 1/2008 | Moryski |
| 2008/0100075 | A1 | * | 5/2008 | Derecktor ................ B60P 3/40 296/3 |
| 2008/0267729 | A1 | * | 10/2008 | Barker ..................... B60P 1/43 410/3 |
| 2009/0026784 | A1 | * | 1/2009 | Green ....................... B60R 9/00 296/3 |
| 2010/0040413 | A1 | | 2/2010 | Whaley |
| 2010/0316474 | A1 | * | 12/2010 | Stiles .................... B60P 3/1066 414/462 |
| 2011/0250042 | A1 | * | 10/2011 | Juarez-Ortega ....... B60P 3/1025 414/559 |
| 2017/0120833 | A1 | * | 5/2017 | Rudnicki .............. B60P 3/1016 |

FOREIGN PATENT DOCUMENTS

| | | | | |
|---|---|---|---|---|
| CA | 2299799 | A1 | | 8/2001 |
| CA | 2328086 | A1 | | 9/2001 |
| CA | 2464210 | A1 | | 5/2003 |
| CA | 2517628 | A1 | | 3/2006 |
| CA | 2646889 | A1 | | 9/2007 |
| DE | 2846791 | A1 | * | 5/1980 ............... B60P 3/10 |
| FR | 1384723 | A | * | 1/1965 ........... B60P 3/1066 |
| FR | 2862922 | A1 | * | 6/2005 ........... B60P 3/1033 |
| FR | 2877891 | B1 | * | 8/2008 ........... B60P 3/1058 |
| WO | WO-2007109808 | A2 | * | 9/2007 ............... B63C 3/06 |

\* cited by examiner

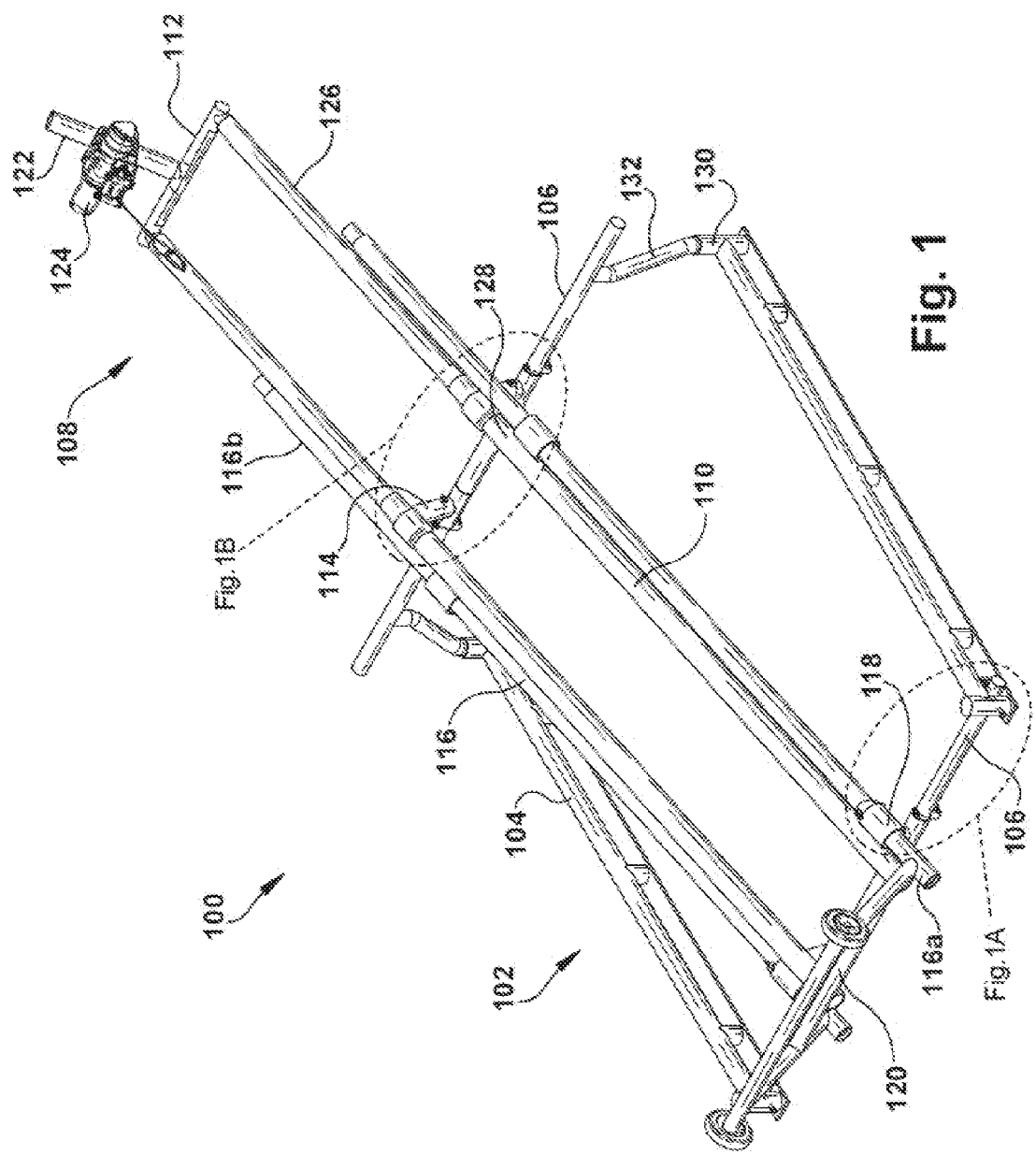

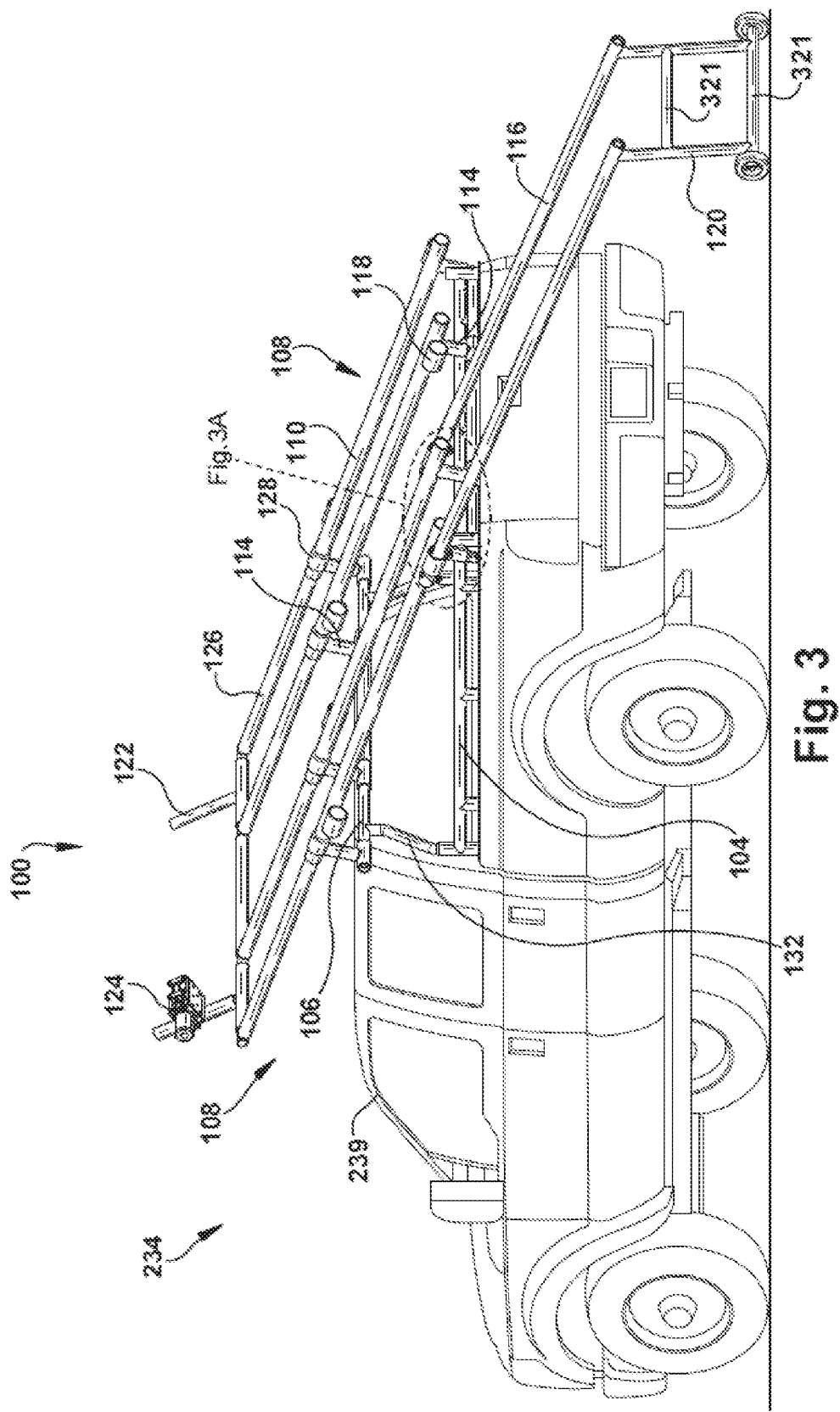

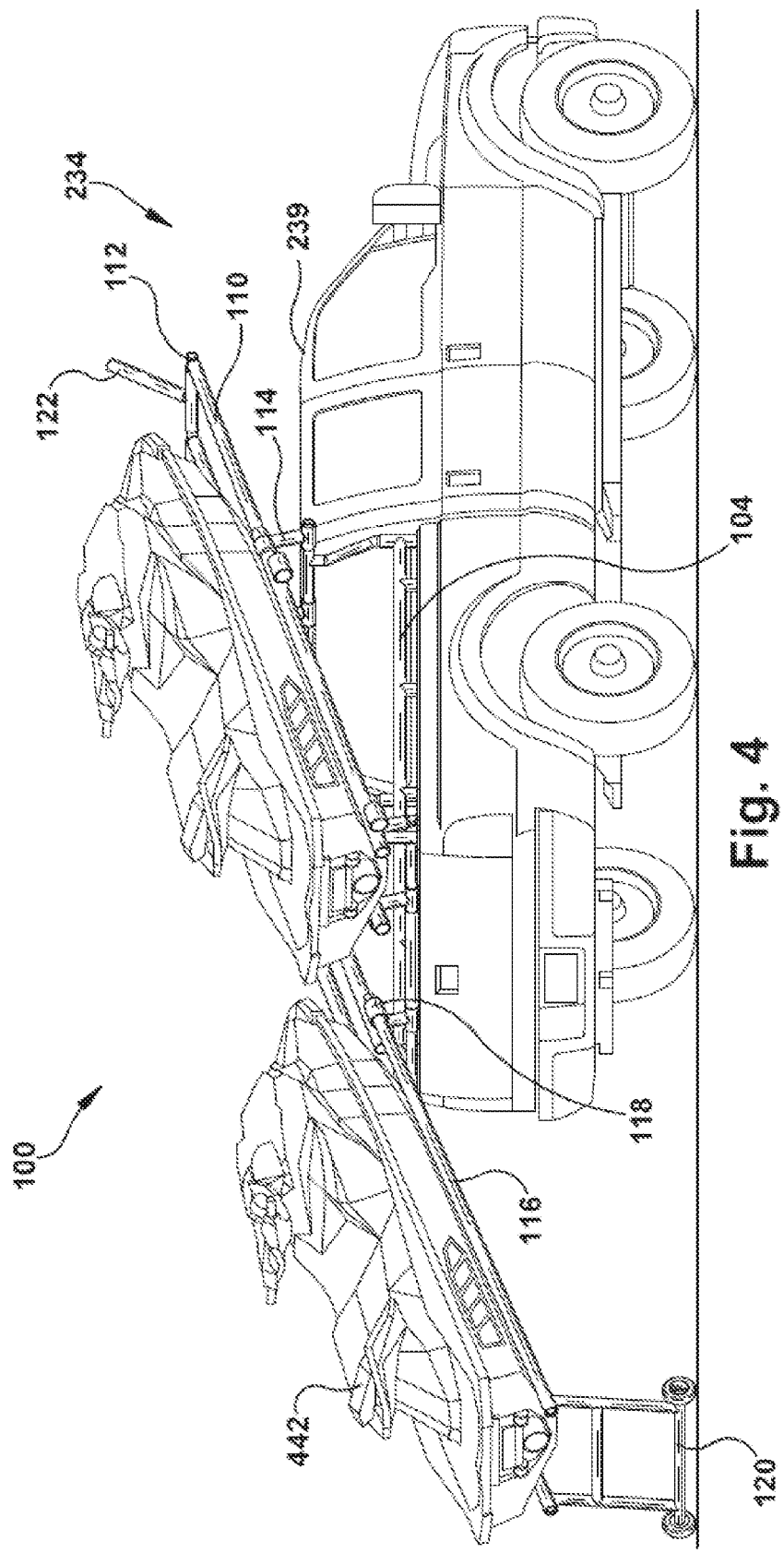

```
700 ─┐
     ▼
┌─────────────────────────────┐
│ Remove hardware to free     │
│ telescoping members from    │  (710)
│ inner frame                 │
└─────────────────────────────┘

┌─────────────────────────────┐
│ Extend telescoping members  │  (720)
│ from inner frame            │
└─────────────────────────────┘

┌─────────────────────────────┐
│ Secure proximate end of     │  (730)
│ extended telescoping members│
└─────────────────────────────┘

┌─────────────────────────────┐
│ Attach cable to personal    │  (740)
│ recreation vehicle          │
└─────────────────────────────┘

┌─────────────────────────────┐
│ Apply tension to load       │
│ personal recreational       │
│ vehicle onto telescoping    │  (750)
│ members and inner frame     │
└─────────────────────────────┘

┌─────────────────────────────┐
│ Remove hardware to free     │  (760)
│ telescoping members         │
└─────────────────────────────┘

┌─────────────────────────────┐
│ Retract telescoping members │  (770)
│ back toward inner frame     │
└─────────────────────────────┘

┌─────────────────────────────┐
│ Re-attach hardware to secure│  (780)
│ telescoping members         │
└─────────────────────────────┘
```

FIG. 7

VEHICLE RACK

RELATED APPLICATIONS

The present application claims priority to and is a continuation-in-part of U.S. patent application Ser. No. 14/282,748, filed May 20, 2014, the entire contents of which are incorporated herein by reference.

BACKGROUND

Personal recreational vehicles such as jet skis, snowmobiles, all-terrain vehicles ATVs, and the like, are enjoyed by many outdoor enthusiasts. Personal recreational vehicles may be transported from a storage location to a point of use. For example, personal watercraft (PWC) may be transported to a body of water prior to use. Traditional methods of hauling personal recreational vehicles include the use of trailers and vehicles with cargo areas such as truck beds. Hauling personal recreational vehicles may limit outdoor enthusiasts to using a vehicle to pull a trailer holding these items. Based on the remoteness of some recreational vehicle activities, many outdoor enthusiasts often enjoy camping in addition to using personal recreational vehicles. Transporting a recreational vehicle on either a trailer or in a truck cargo area may prevent outdoor enthusiasts from also towing a travel trailer or camper.

The present application appreciates that convenient transportation of personal recreational vehicles may be a challenging endeavor.

SUMMARY

In one embodiment, a vehicle rack for conveying a personal vehicle is provided. The vehicle rack for conveying a personal vehicle may include an outer frame. The outer frame may be operable to connect to a vehicle. The outer frame may include two longitudinal outer frame parallel members. The two longitudinal outer frame parallel members may be joined by at least one outer frame cross member. The vehicle rack for conveying a personal vehicle may include at least one inner frame. The at least one inner frame may be operatively connected to the at least one outer frame cross member. The at least one inner frame may include two longitudinal inner frame parallel members. The two longitudinal inner frame parallel members may be joined by at least one inner frame cross member. The vehicle rack for conveying a personal vehicle may include two telescoping members. Each telescoping member may be operatively connected to a longitudinal inner frame parallel member. The two telescoping members may be operable to extend from and retract to the two longitudinal inner frame parallel members, such that when extended, the two telescoping members may form a substantially parallel rail operable to convey an item for storage on the inner frame. The vehicle rack for conveying a personal vehicle may include at least two telescoping member guides. The at least two telescoping member guides may each be operatively connected to each of the two longitudinal inner frame parallel members. The at least two telescoping member guides may be operable to guide and retain each of the two telescoping members. The at least two telescoping member guides may be further operable to adjust an angle of each of the two telescoping members.

In another embodiment, a vehicle rack for conveying a personal vehicle is provided. The vehicle rack for conveying a personal vehicle may include an outer frame. The outer frame may include two longitudinal outer frame parallel members. The two longitudinal outer frame parallel members may be joined by at least one outer frame cross member. The at least one outer frame cross member may be adjustable in three dimensional space relative to the two longitudinal outer frame parallel members to vary at least one of a length, a height, and a depth of the at least one outer frame cross member relative to the two longitudinal outer frame parallel members. The vehicle rack for conveying a personal vehicle may include at least one inner frame. The at least one inner frame may be operatively connected to the at least one outer frame cross member by at least one adjustable inner frame standoff. The at least one inner frame may include two longitudinal inner frame parallel members. The two longitudinal inner frame parallel members may be joined by at least one inner frame cross member. The vehicle rack for conveying a personal vehicle may include two telescoping members. Each telescoping member may be operatively connected to a longitudinal inner frame parallel member. The two telescoping members may be operable to extend from and retract to the two longitudinal inner frame parallel members, such that when extended, the two telescoping members may form a substantially parallel rail operable to convey an item for storage on the inner frame. The vehicle rack for conveying a personal vehicle may include at least two telescoping member guides. The at least two telescoping member guides may each be operatively connected to each of the two longitudinal inner frame parallel members. The at least two telescoping member guides may be operable to guide and retain each of the two telescoping members. The at least two telescoping member guides may be further operable to adjust an angle of each of the two telescoping members.

In another embodiment, a method for securing a personal vehicle to a vehicle rack is provided. The method for securing a personal vehicle to a vehicle rack may include: removing one or more quick-connect hardware from a distal end of each of two or more telescoping member guides to free two retracted telescoping members connected to at least one inner frame. The method for securing a personal vehicle to a vehicle rack may include extending two telescoping members from the at least one inner frame. The method for securing a personal vehicle to a vehicle rack may include securing a proximate end of the extended telescoping member to at least one telescoping member guide with the one or more quick-connect hardware. The method for securing a personal vehicle to a vehicle rack may include securing at least one of a rope, chain, and cable to a personal recreational vehicle. The method for securing a personal vehicle to a vehicle rack may include applying a tension with a tensioning device to the at least one of a rope, chain, and cable, such that the tension draws the personal recreational vehicle onto the two extended telescoping members and further onto the at least one inner frame. The method for securing a personal vehicle to a vehicle rack may include removing the one or more quick-connect hardware from each of the at least one telescoping member guides to free the proximate end of each of the two extended telescoping members. The method for securing a personal vehicle to a vehicle rack may include retracting the proximate end of each of the two extended telescoping members back toward the at least one inner frame. The method for securing a personal vehicle to a vehicle rack may include re-securing the one or more quick-connect hardware to both of a distal end of telescoping members and telescoping member guides to secure telescoping members relative to the at least one inner frame.

BRIEF DESCRIPTION OF THE DRAWINGS

The accompanying figures, which are incorporated in and constitute a part of the specification, illustrate various example systems and methods, and are used merely to illustrate various example embodiments.

FIG. 1 illustrates a perspective view of an example vehicle rack.

FIG. 3 illustrates a perspective view of an example vehicle rack mounted to a vehicle.

FIG. 4 illustrates a perspective view of an example vehicle rack with personal recreational vehicles mounted to a vehicle.

FIG. 7 illustrates a flow chart of an example method for using a vehicle rack.

DETAILED DESCRIPTION

Figure 1A:
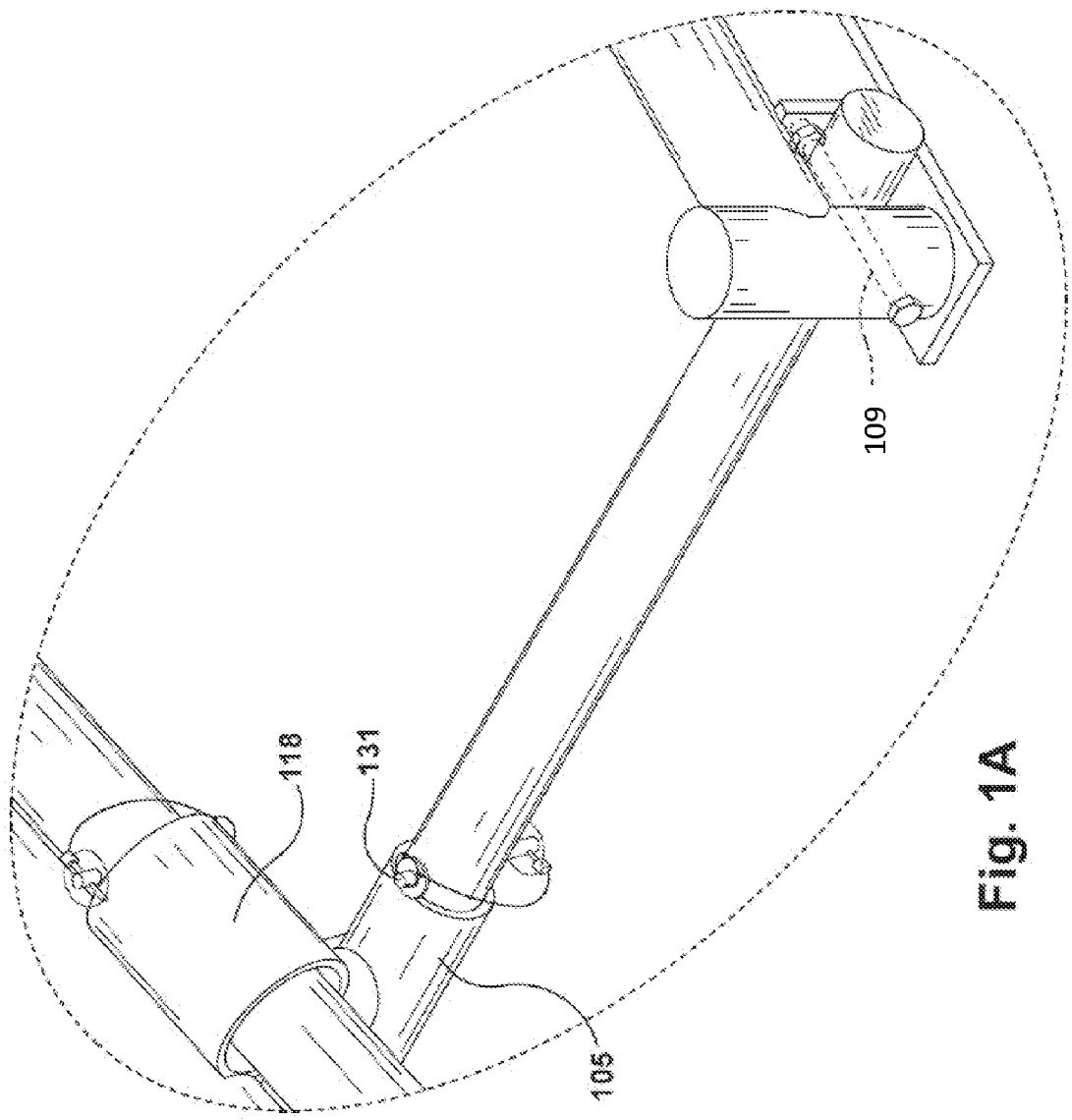
FIG. 1A illustrates certain portions of an example vehicle rack in greater detail.
Figure 1B:
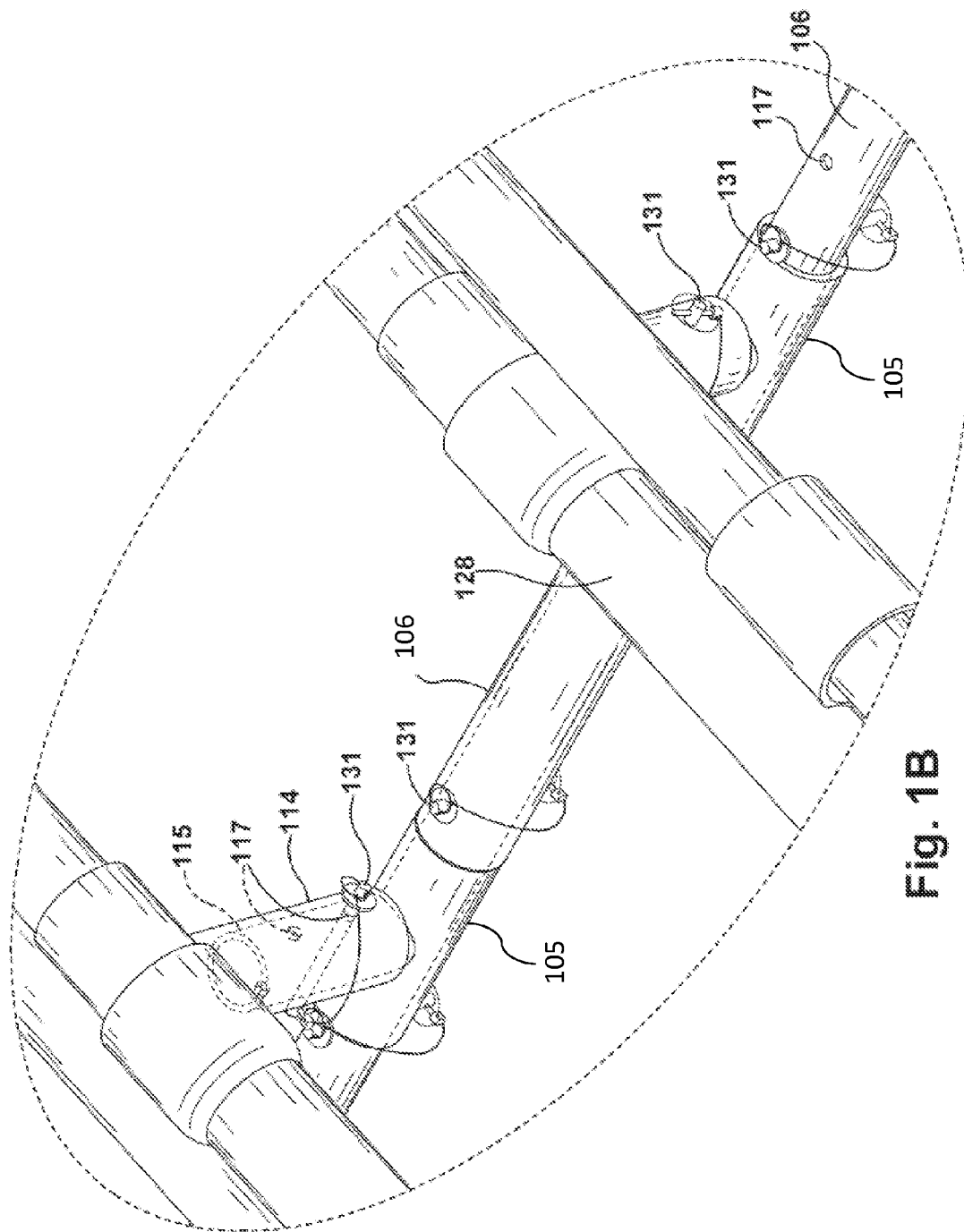
FIG. 1B illustrates certain portions of an example vehicle rack in greater detail.
Figure 1C:
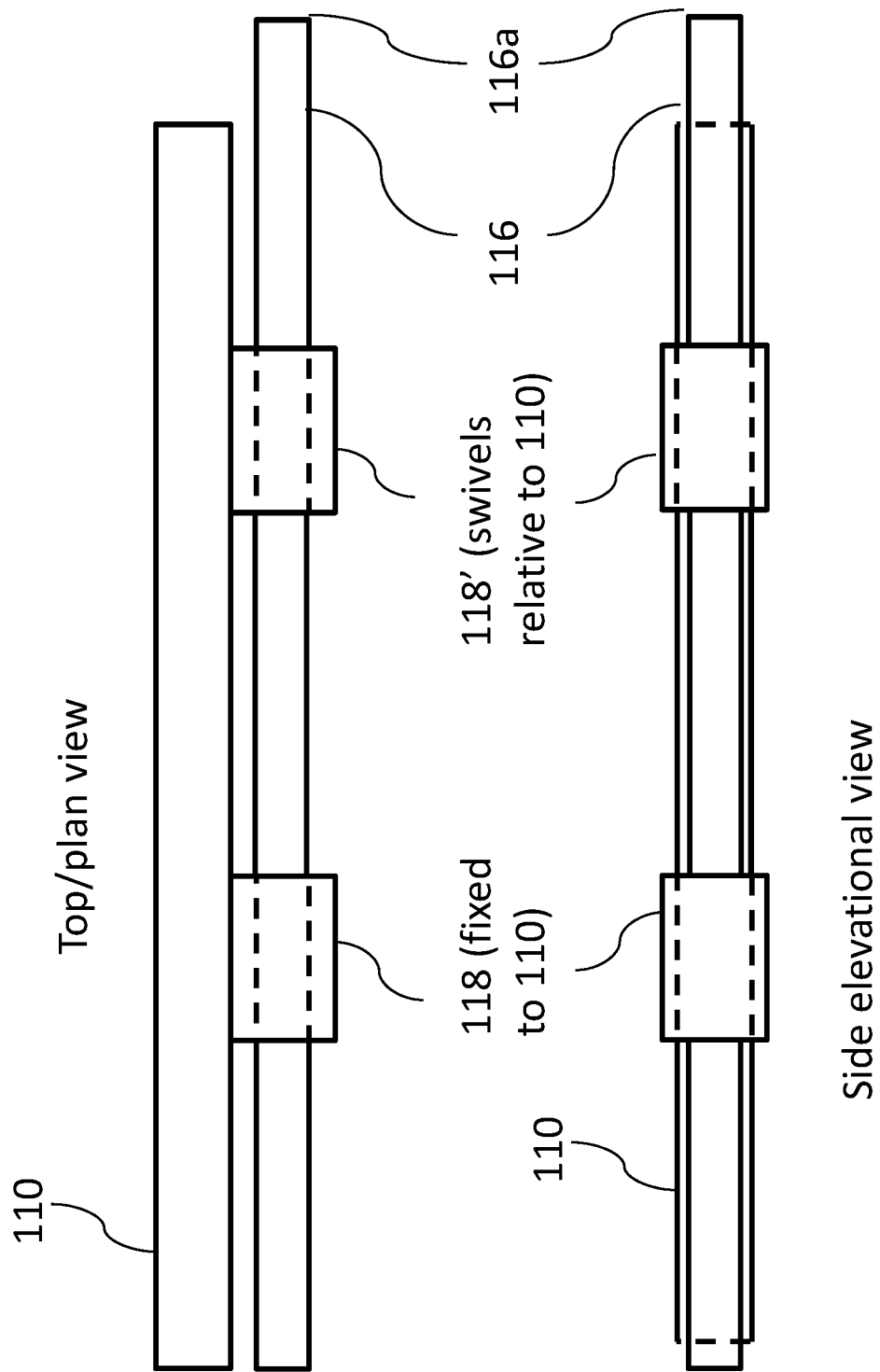
FIG. 1C illustrates certain portions of an example vehicle rack in greater detail, including top/plan and side elevational views of two telescoping members guides disposed on each longitudinal inner frame parallel member.
Figure 1D:
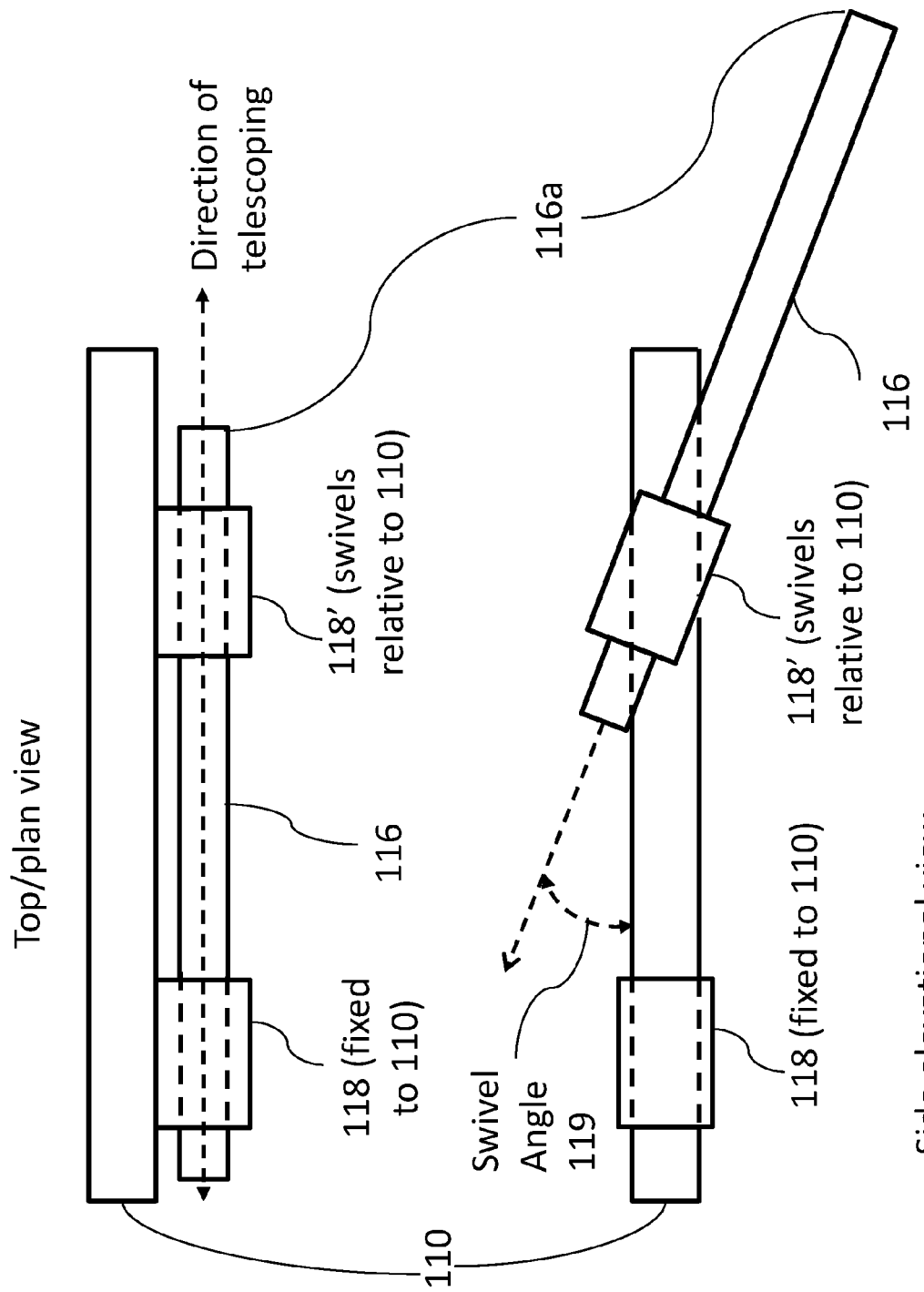
FIG. 1D illustrates certain portions of an example vehicle rack in greater detail, including top/plan and side elevational views of two telescoping members guides, including a telescoping guide that may swivel.

FIG. 1 illustrates a perspective view of vehicle rack 100, while FIGS. 1A and 1B show certain portions of vehicle rack 100 in greater detail. Vehicle rack 100 may be mounted to a vehicle such as a trailer or vehicle with a cargo area to convey one or more personal recreational vehicles such as a snowmobile, personal watercraft, ATV, and like vehicles, and to provide an easy loading/unloading of personal recreational vehicles.

Vehicle rack 100 may include an outer frame 102 and one or more inner frames 108.

Outer frame 102 may be mounted to a trailer or motor vehicle to load/unload and convey one or more personal recreational vehicles. Outer frame 102 may further include at least two longitudinal outer frame parallel members 104. Longitudinal outer frame parallel members 104 may be permanently affixed to a vehicle or trailer or selectively affixed to a vehicle or trailer such that longitudinal outer frame parallel members 104 may be attached to or removed from a vehicle with a tool and a hardware. In one embodiment, longitudinal outer frame parallel members 104 of outer frame 102 are the only portion of vehicle rack 100 attached to a vehicle. Outer frame 102 may also include at least one outer frame cross member 106 which interconnects and is operatively connected to each longitudinal outer frame parallel member 104. One or more points of outer frame cross member 106 may be operatively connected to one or more inner frames 108.

Inner frame 108 is operable to retain and convey a personal recreational vehicle. In one embodiment, vehicle rack 100 conveys one personal vehicle on inner frame 108. In another embodiment, vehicle rack 100 conveys two personal vehicles on two inner frames 108. Each inner frame 108 includes two longitudinal inner frame parallel members 110 operatively connected to one or more inner frame cross members 112. Inner frame 108 may connect directly to outer frame cross member 106 or inner frame 108 may connect to outer frame cross member via one or more inner frame standoffs 114. Inner frame 108 may operatively connect to telescoping members 116.

Telescoping members 116 may operatively connect to inner frame 108. In one embodiment a telescoping member 116 is adjacent to longitudinal inner frame parallel member 110 and secured by one or more telescoping member guides 118 operatively connected to longitudinal inner frame parallel members 110. In another embodiment, telescoping members 116 fit within all or portions of longitudinal inner frame parallel member 110 and extend therefrom. A distal end portion 116a of telescoping members 116 may extend away from inner frame 108 to facilitate in a loading/unloading of a personal recreational vehicle. A proximal end portion 116b of telescoping members 116 may remain in contact with inner frame 108 and connect to one or more telescoping member guides 118 to form a secure connection between telescoping members 116 and inner frame 108. An adjustable dolly 120 may interconnect distal ends 116a of telescoping members 116. Adjustable dolly 120 provides a wheeled support of telescoping members 116 when loading and unloading a personal recreational vehicle.

One or more telescoping members guides 118 disposed on each longitudinal inner frame parallel member 110 secure telescoping members 116 adjacent to inner frame 108 and secure telescoping members 116 in both a retracted and extended position. In one embodiment, at least one distal telescoping member guide 118' (FIGS. 1C and 1D) for each telescoping member 116 may swivel to adjust an angle 119 of telescoping member 116. Distal telescoping member guide 118' may use detents or other mechanical restrictions to vary a swivel angle 119 in fixed intervals. Distal telescoping member guide 118' may have a locking capability to fix a swivel angle 119. Varying the angle 119 of telescoping member 116 using distal telescoping member guide 118' may allow vehicle rack 100 to load and unload personal recreational vehicles in a variety of locations. For example, distal telescoping member guides 118' may swivel to vary angles 119 of telescoping members 116, and height and angle of distal end 116a of telescoping members 116, e.g., including dolly 120, may be adjusted to provide firm contact with a ground or lake bottom at the variety of locations so as to load and unload a personal recreation vehicle.

An angle of both inner frame 108 and telescoping members 116 may be also adjusted by varying a height of outer frame cross member 106 or height of inner frame 108 relative to outer frame cross member 106 via one or more standoffs 114. Height of outer frame cross member 106 may be varied by adjusting a height of vertical member 132. Vertical member 132 may fit within socket 130 on longitudinal outer frame parallel member 104 and vertical member 132 may be selectively secured within socket 130. In one embodiment, vertical member 132 is an adjustable component allowing a height of vertical member 132 to be varied. In another embodiment, vertical member 132 is a fixed height modular component that may be swapped out for a vertical member 132 of a different height depending on need and function of vehicle rack 100. In one embodiment, vertical member 132 may be selectively secured to socket 130 by a quick-connect hardware (not shown) such as a hitch pin, linchpin, cotter pin and the like. In another embodiment, height and angle of inner frame 108 and thus telescoping members 116 are varied by varying a height between inner frame 108 and outer frame cross member 106 via one or more standoffs 114. In one embodiment, standoffs 114 may be substituted for a standoff 114 of a different height depending on need and function of vehicle rack 100. With reference to FIG. 1B, in another embodiment, standoff 114 fits over a telescoping member of a smaller width 115 and standoff 114 may be adjusted relative to telescoping member of smaller width 115 to vary height and angle of vehicle rack 100. In this embodiment, standoff 114 and telescoping member of smaller width 115 may have one or more apertures 117 therethrough. When a desired height of standoff 114 relative to telescoping member of smaller width 115 is achieved, the apertures 117 through both standoff 114 and telescoping member of smaller width 115 are aligned and quick-connect hardware 131 is inserted through apertures 117 to lock height of standoff 114 relative to telescoping inner member of smaller width 115 into place, and thus lock height of vehicle rack 100 in place. Thus, standoff 114 may be adjustable to vary a height between inner frame 108 and outer frame cross member 106 to vary a height and angle of inner frame 108 and telescoping members 116.

Outer frame cross member 106 may fit within and pass through sleeve 105. In one embodiment, sleeve 105 can vary in length, such that placement of sleeve 105 between telescoping inner members 115 can vary a width between each longitudinal inner frame parallel member 110, thus allowing for an adjustable width of inner frame 108. In this embodiment, one sleeve 105 may be substituted with another sleeve 105 of greater length to provide a wider inner frame 108. In another embodiment, cross member 106 is discontinuous, such that cross member 106 includes a left portion and a right portion secured together by sleeve 105. In this embodiment, sleeve 105 includes apertures 117 therethrough which correspond to apertures 117 on cross member 106. In this embodiment, the complete width of vehicle rack 100 may be varied by the interconnection between different portions of cross member 106 and sleeve 105 using quick connect hardware 131 secured through apertures 117 in both cross member 106 and sleeve 105 such that vehicle rack 100 may be varied to fit on different vehicles.

Inner frame 108 may also include tensioning device mount 122. Tensioning device mount 122 may be operable to mount a tensioning device 124 used for loading/unloading a personal recreational vehicle to and from inner frame 108 via telescoping members 116. In one embodiment, tensioning device 124 is selectively removable from tensioning device mount 122 to add and remove a tensioning device 124. Selectively removable tensioning device 124 may be added and removed to one or more tensioning device mounts 122 on inner frames 108. In another embodiment, tensioning device 124 is permanently mounted to tensioning device mount 122 with each tensioning device mount 122 requiring a tensioning device 124. In one embodiment, tensioning device 124 is a manual device which requires physical energy from a user, for example by manually cranking a reel, to add tension to a cable, rope, or chain attached to a personal recreational vehicle to load/unload a personal recreational vehicle. In another embodiment, tensioning device 124 runs a motor from a power supply to provide tension while loading/unloading a personal recreational vehicle. A motor actuated tensioning device 124 may run from an external power supply such as a vehicle battery to power an electric motor or use another power source like a vehicles engine to actuate tensioning device 124 via a power take off (PTO)/driveshaft, pneumatics, or hydraulics to provide tension. Tensioning device 124 may be remote actuated via a remote control. In one embodiment, using a remote control to actuate tensioning device 124 assists a user in loading/unloading a personal recreational vehicle on/off of telescoping members 116.

Figure 1E:
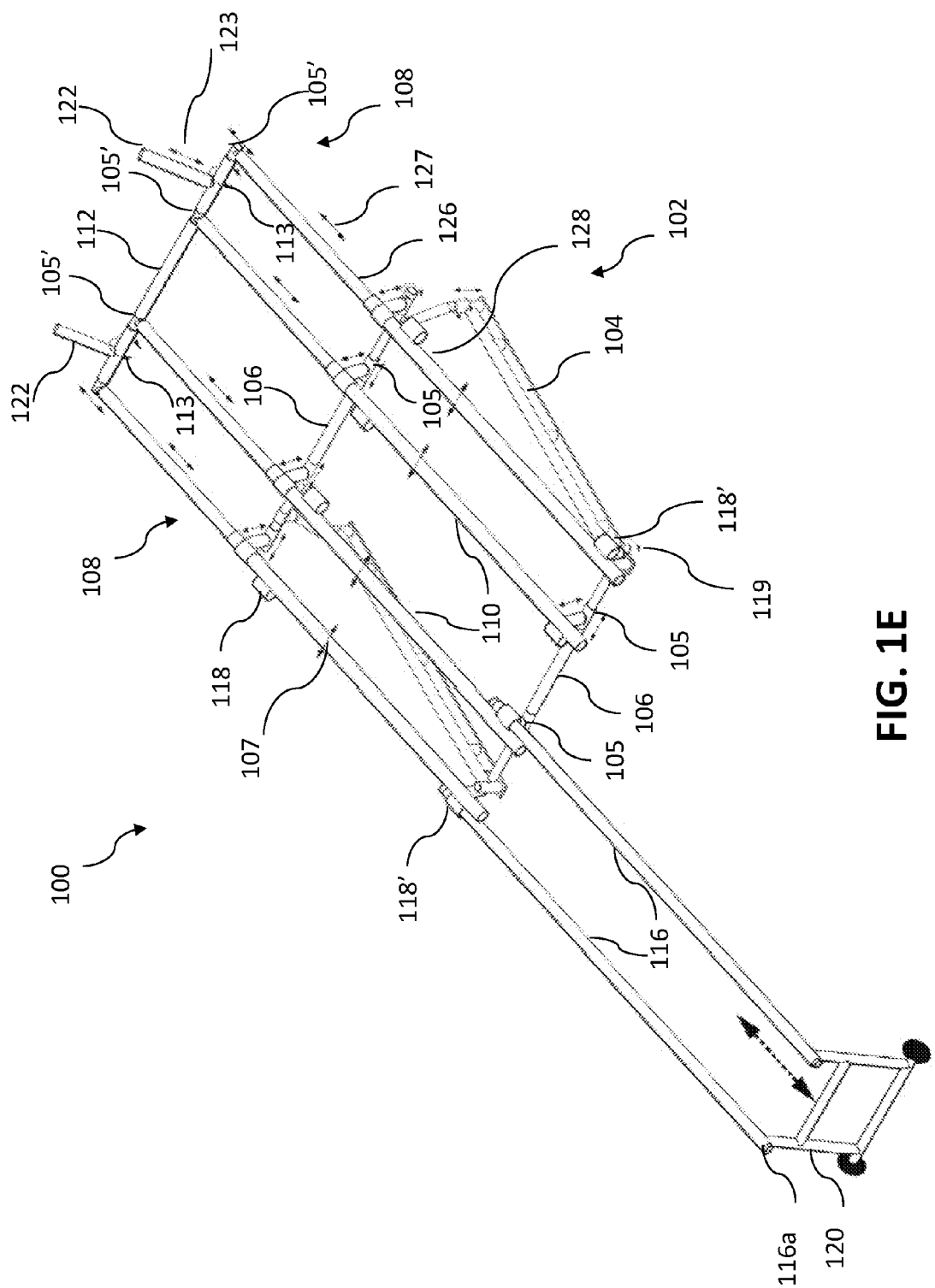
FIG. 1E is a perspective view of an example vehicle rack with two inner frames.

Referring to FIG. 1E, a perspective view of vehicle rack 100 with two inner frames 108 is illustrated. In addition to illustrating the various features described above, FIG. 1E gives an overall view of various translational and rotational adjustment motions provided by the features described above and in further detail below.

For example, longitudinal inner frame parallel members 110 (and portions 126 and 128) may be independently be adjusted laterally in direction 107 via adjustments between outer frame cross member 106 and sleeves 105, and inner frame cross member 112 and pass through sleeves 105', as follows.

Outer frame cross member 106 may fit within and pass through sleeves 105. In one embodiment, sleeves 105 can vary in length, such that placement of sleeves 105 between telescoping inner members 115 can vary a width between each longitudinal inner frame parallel member 110, thus allowing for an adjustable width of inner frame 108. In this embodiment, one sleeve 105 may be substituted with another sleeve 105 of greater length to provide a wider inner frame 108. In another embodiment, cross member 106 is discontinuous, such that cross member 106 includes two or more portions secured together by sleeves 105. In this embodiment, sleeves 105 may include features (e.g., apertures) 117 and corresponding features (e.g., apertures or detents) 117 on cross member 106. In this embodiment, the width of vehicle rack 100 may be varied by the interconnection between different portions of cross member 106 and sleeve 105 using quick connect hardware 131 secured according to features 117 in both cross member 106 and sleeve 105 such that vehicle rack 100 may be varied to fit on different vehicles. In one embodiment, sleeves 105 may fit over cross member 106 and may be adjusted laterally in direction 107 along cross member 106. For example, referring to FIGS. 1A and 1B, sleeves 105 may being fixed in defined positions using quick connect hardware 131 secured through apertures 117 in both cross member 106 and sleeve 105.

Likewise, longitudinal inner frame parallel members 110 (and portions 126 and 128) may be correspondingly adjusted laterally in direction 107 along inner frame cross member 112. Inner frame cross member 112 may fit within and pass through sleeve 105'. In one embodiment, sleeve 105' can vary in length, such that placement of sleeve 105' between telescoping inner members 115 can vary a width between each longitudinal inner frame parallel member 110, thus allowing for the adjustable width of inner frame 108. In this embodiment, one sleeve 105' may be substituted with another sleeve 105' of greater length to provide a wider inner frame 108. In another embodiment, inner frame cross member 112 is discontinuous, such that inner frame cross member 112 includes one or more portions secured together by sleeves 105'. In this embodiment, sleeve 105' includes features (e.g., apertures) 117 that may correspond to features (e.g., apertures or detents) 117 on inner frame cross member 112. In this embodiment, the complete width of vehicle rack 100 may be varied by the interconnection between different portions of inner frame cross member 112 and sleeve 105' using quick connect hardware 131 secured at features 117 such that vehicle rack 100 may be varied to fit on different vehicles. In one embodiment, sleeves 105' may fit over cross member 112 and may be adjusted laterally in direction 107 along cross member 112. Further, in some embodiments, where inner frame cross member 112 includes one or more portions secured together by sleeves 105', the one or more portions of cross member 112 may be rotated, e.g., in rotational direction 113 to adjust the position of tensioning device mount 122. In some embodiments, tensioning device mount 122 may be adjustable in length along direction 123, for example, according to an internal telescoping mechanism (not shown). In various embodiments herein, quick connect hardware, such as 131, may be alternatively configured as a set screw, a spring loaded button, and the like. For example, in a set screw configuration, quick connect hardware such as 131 may be secured against another member such as cross member 112, either via a feature such as 117, which may be configured as an aperture or detent in cross member 112, or in the absence of a feature such as 117.

In another embodiment, an upper portion of inner frame 108 may translate longitudinally along direction 127 as follows. Portion 126 of inner frame 108 may have a first width/diameter which may allow portion 126 to telescope within portion 128 having a second width/diameter larger than first width/diameter of portion 126. Portion 126 may be secured within portion 128 by quick connect hardware, a set screw, a spring loaded button, and the like (not shown). This general telescoping mechanism between portion 126 and portion 128 is exemplary of telescoping mechanisms that may be implemented elsewhere in vehicle rack 100 but, for reasons of clarity of drawing, are not shown in each instance of the drawing where such telescoping mechanisms may be implemented in various embodiments.

In various embodiments, the inner frame 108 is coupled to the outer frame 102 at various points by standoffs 114 coupled to sleeves 105/105'. The standoff distance provided by standoffs 114 may be varied, for example, by replacing standoffs 114 of one length with those of another length.

Figure 1F:
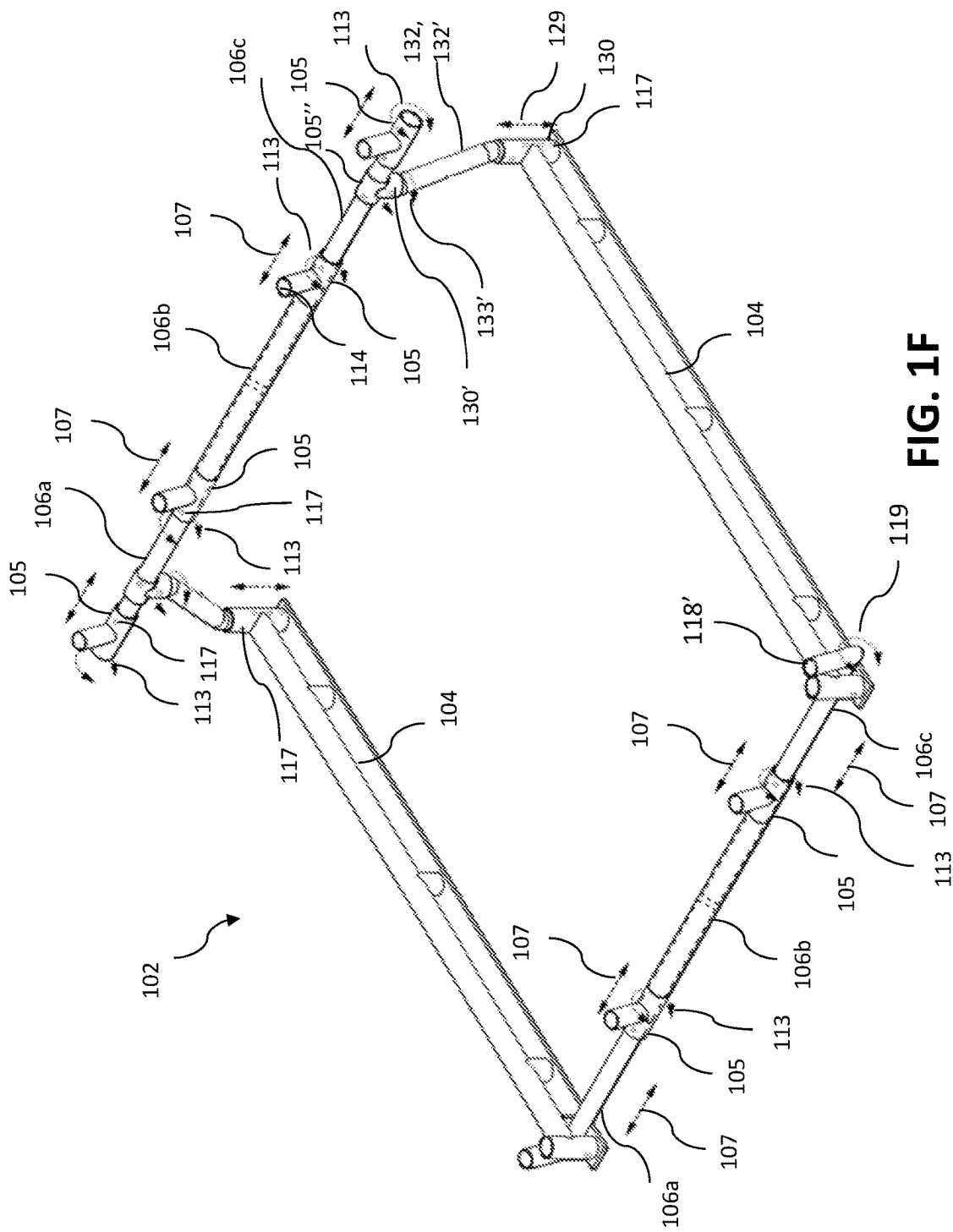
FIG. 1F is a perspective view of an outer frame of an exemplary vehicle rack without inner frames, in order to further illustrate aspects of the outer frame and components thereof shown in FIG. 1E.
Figure 1G:
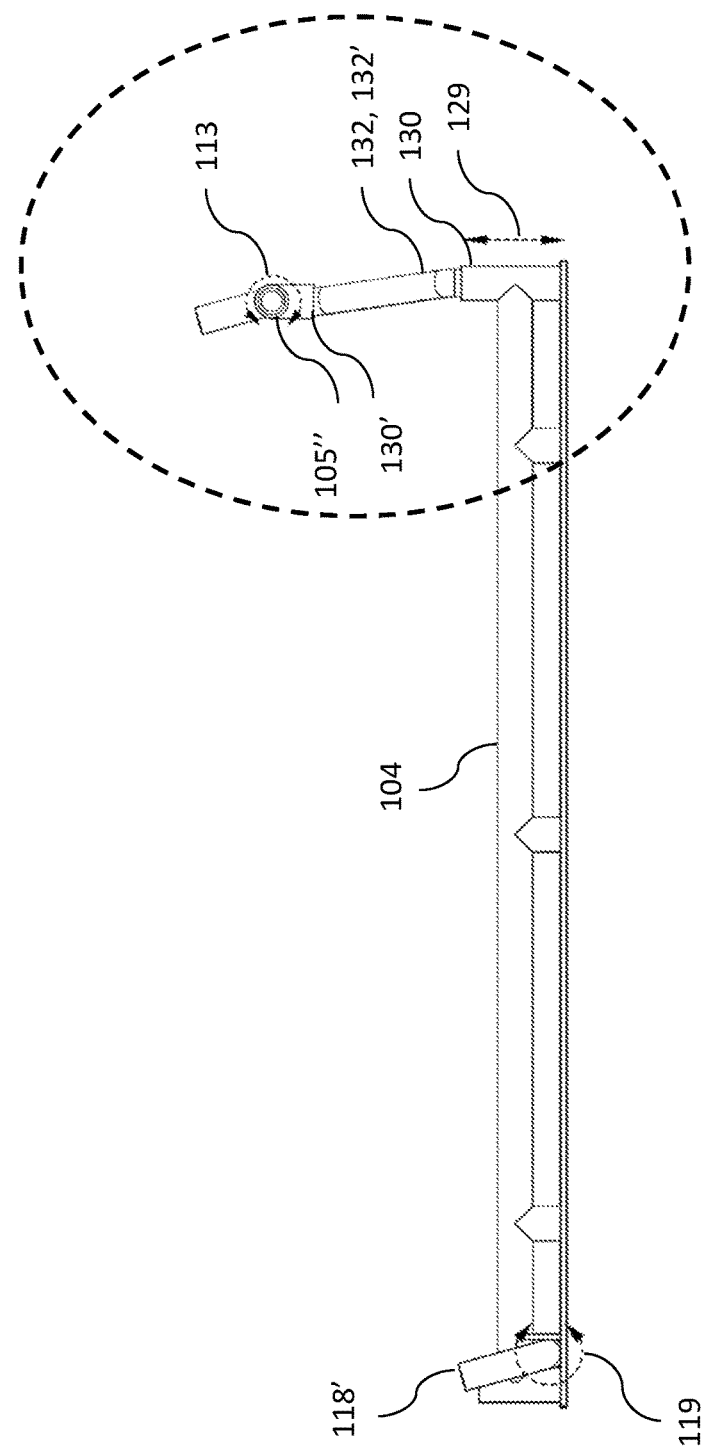
FIG. 1G is a side view of an outer frame of an exemplary vehicle rack without inner frames, in order to further illustrate aspects of the outer frame and components thereof shown in FIG. 1E.
Figure 1H:
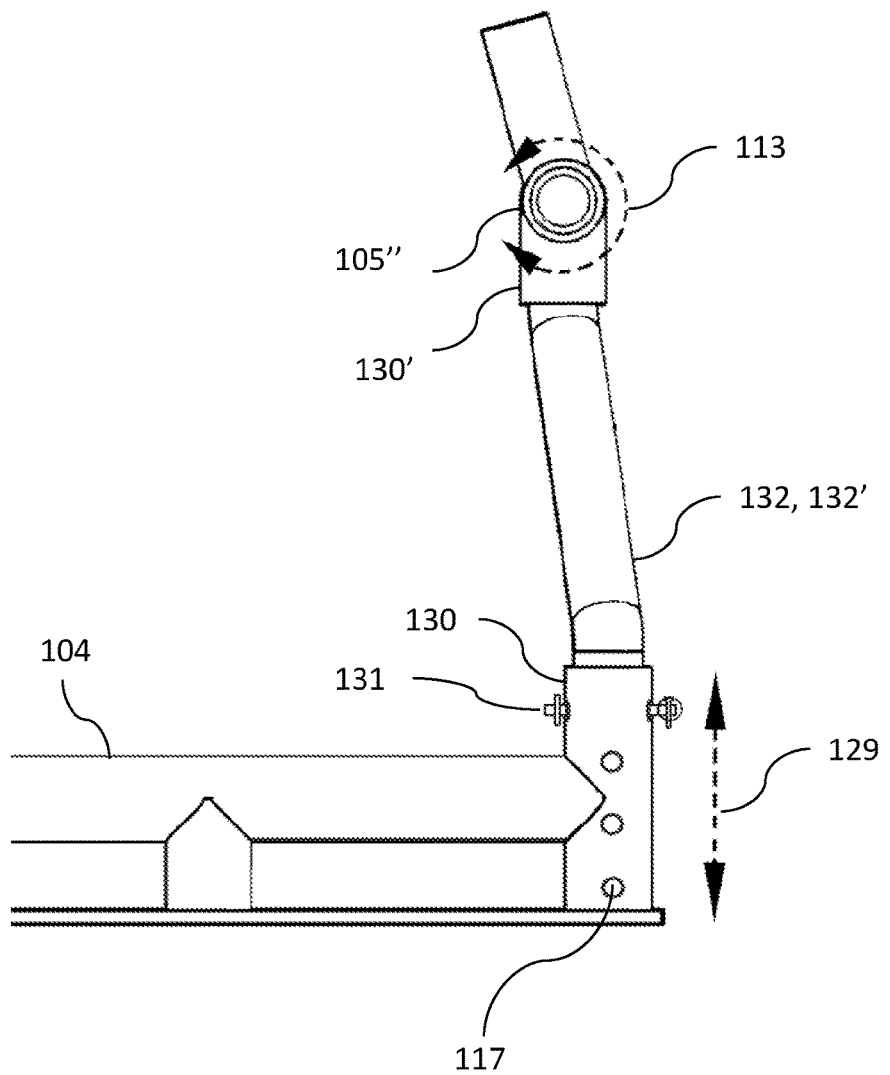
FIG. 1H is an expanded view of the side view of an outer frame of an exemplary vehicle rack without inner frames, in order to further illustrate aspects of the outer frame and components thereof shown in FIG. 1G.

FIG. 1F shows a perspective view and FIG. 1G a side view, each of outer frame 102, without inner frames 108, in order to further illustrate aspects of outer frame 102 and components thereof mentioned in FIG. 1E. In addition, FIGS. 1F and 1G show aspects of vertical member 132, which may have an angled portion 132' that extends from lower socket 130 to upper socket 130'. FIG. 1H shows an expanded view of the section indicated by the dotted oval in FIG. 1G.

FIG. 1F illustrates outer frame cross member 106 as an assembly of telescoping pieces 106a, 106b, and 106c. For example, side telescoping members 106a and 106c may be of the same diameter and may fit within center telescoping member 106b effective to permit outer frame cross member 106 (as an assembly of telescoping pieces 106a, 106b, and 106c) to be lengthened or shortened along direction 107, e.g., to accommodate mounting within vehicles of different bed sizes. Assembly of telescoping pieces 106a, 106b, and 106c may be fixed at a particular length by fixing outer frame 102 to a particular vehicle such that side telescoping members 106a and 106c are constrained at their attachment to outer frame parallel member 104, each of which in turn may be fixed to the vehicle. Alternatively, or in addition, side telescoping members 106a and 106c may be fixed in position by quick connect hardware (not shown, but corresponding to the quick connect hardware 131 and features 117 described herein for various connections). More generally, it is explicitly contemplated that any tubular member described herein may be configured as a telescoping assembly of two or more nesting members, which may be may be fixed in position by quick connect hardware described herein. For example, in various embodiments, tubular members herein that may be configured as a telescoping assembly include, e.g., 104, 106, 110, 112, 114, 116, 122, 130, 130', 132, 132', and the like In some embodiments, vertical member 132 may be raised or lowered with respect to its insertion in lower socket 130 and upper socket 130' to vary a height of outer frame cross member 106 (e.g., as assembly of telescoping pieces 106a, 106b, and 106c) along direction 129. In several embodiments, the height of outer frame cross member 106 (e.g., as assembly of telescoping pieces 106a, 106b, and 106c) along direction 129 may be varied by using vertical member 132 of varied lengths.

Lower socket 130 may be coupled to outer frame parallel member 104. Upper socket 130 may be coupled to sleeve 105". Sleeve 105" may, like sleeves 105/105', interact with cross member 106 to be rotated along rotational direction 113, to provide translation along direction 107 to allow the length of cross member 106 to be lengthened or shortened, and the like. Vertical member 132 may be configured with parallel lower and upper socket portions (not visible) coupled to respective ends of angled portion 132'. The parallel lower and upper socket portions of vertical member 132 may seat into, and may rotate within, lower socket 130 and upper socket 130'.

In various embodiments, by rotation of parallel lower and upper socket portions of vertical member 132 in lower socket 130 and upper socket 130', the angled portion 132' may provide motion of cross member 106 in two dimensions. For example, each angled portion 132' may be rotated 133' to move cross member 106 along direction 133, e.g., front to back with respect to a vehicle that vehicle rack 100 may be mounted in.

Further, the angled portion 132' may be rotated to translate, shorten, or lengthen cross member 106 along direction 107. For example, rotation of each angled portion 132' towards each other to the center would provide for shortening cross member 106 (e.g., as assembly of telescoping pieces 106a, 106b, and 106c) along direction 107. In another example, rotation of each angled portion 132' away from each other may provide for lengthening cross member 106 (e.g., as assembly of telescoping pieces 106a, 106b, and 106c) along direction 107. In another example, rotation of each angled portion 132' to one side or the other may provide for offset motion of cross member 106 (e.g., as assembly of telescoping pieces 106a, 106b, and 106c) along direction 107, or alternately lengthening and shortening cross member 106 (e.g., as assembly of telescoping pieces 106a, 106b, and 106c) along direction 107. In a further example, rotation of each angled portion 132' may be accommodated by translation of sleeves 105/105" along direction 107 of cross member 106. In some embodiments, rotation of each angled portion 132' may be accommodated by replacement of sleeves 105/105" or cross member 106 with corresponding longer or shorter versions of sleeves 105/105" or cross member 106, thereby adjusting the effective length or translation of cross member 106 along direction 107. Further, adjusting the length or translation of sleeves 105/105" or cross member 106 along direction 107 may provide for adjustment of each inner frame 108 along direction 107.

In various embodiments herein, quick connect hardware, such as 131, may be configured as a through pin with cotter pin, e.g., as in FIG. 1H, or alternatively configured as other quick connect hardware known to the art, such as a set screw, a spring loaded button, and the like. For example, quick connect hardware such as 131 may be secured through a feature 117, e.g., configured as a hole, in a larger diameter member such lower socket 130 to a smaller diameter member, such as the corresponding portion of vertical member 132 held within the larger diameter member such lower socket 130. In embodiments where quick connect hardware, such as 131 is configured as a through pin, etc, the smaller diameter member, such as the corresponding portion of vertical member 132 may also have holes 117 to correspond to holes 117 in the larger diameter member such lower socket 130. In some embodiments, quick connect hardware, such as 131 may be configured as a set screw, spring loaded button, etc, and the smaller diameter member, such as the corresponding portion of vertical member 132 may also have features 117 configured as holes, or as detents. Further, for example, quick connect hardware, such as 131 may be configured as a set screw and the smaller diameter member, such as the corresponding portion of vertical member 132 may be devoid of features 117.

FIG. 1H shows in greater detail exemplary use of quick connect hardware 131 and corresponding features 117 that may be employed to position vertical member 132 in at various heights along direction 129, various rotational positions about 133', and various corresponding translations along 133 and 107 provided by rotation about 133'.

Accordingly, as shown in FIGS. 1E, 1F, and 1G, and further described herein above, in various embodiments of vehicle rack 100, outer frame cross member 106 (e.g., as assembly of telescoping pieces 106a, 106b, and 106c) is adjustable in three dimensional space relative to the two longitudinal outer frame parallel members 104 to vary at least one of a length along direction 107, a height along direction 129, and a depth along direction 133 of the at least one outer frame cross member 106 relative to the two longitudinal outer frame parallel members 104.

Figure 2:
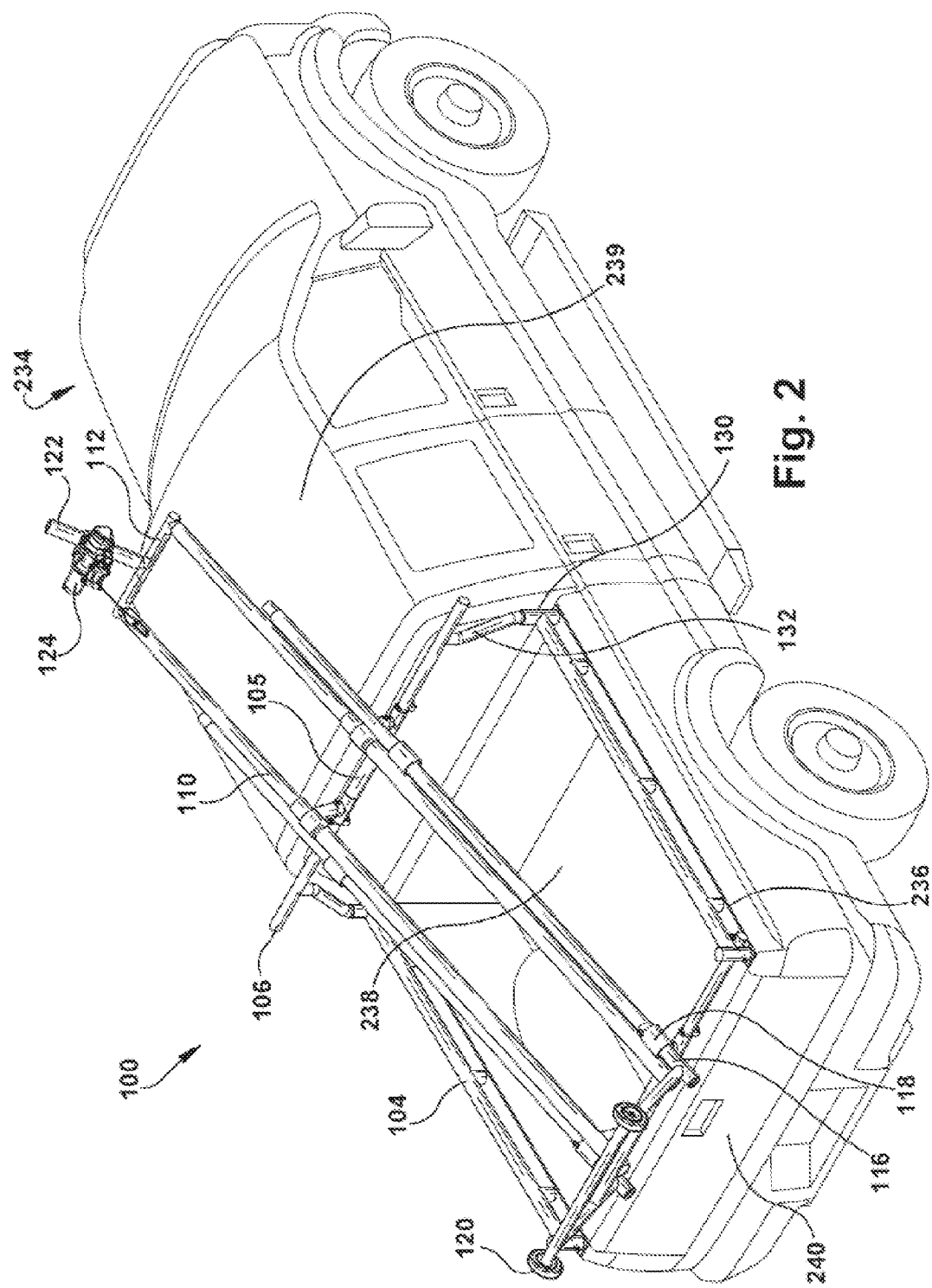
FIG. 2 illustrates a perspective view of an example vehicle rack mounted to a vehicle.

Referring to FIG. 2, a perspective view of vehicle rack 100 mounted to vehicle 234 is illustrated. In one embodiment, vehicle rack 100 is attached over a bed 238 of a pickup truck 234. In this embodiment, vehicle rack 100 allows a personal recreational vehicle to be stored on an angle over both bed 238 and cab 239 of pickup truck 234. Storing a personal recreational vehicle at an angle on longitudinal inner frame parallel members 110 of inner frame 108 may prevent overhang of personal recreational vehicle past tailgate 240 such that a trailer may be towed behind pickup truck 234 while conveying personal recreational vehicle on vehicle rack 100. Vehicle rack 100 may be permanently mounted to pickup truck 234, for example, by permanently affixing longitudinal outer frame parallel members 104 to side rails 236 of pickup truck 234. Other components of vehicle rack 100 may be removed relative to longitudinal outer frame parallel members 104. For example, vertical member 132 may be removed from socket 130 to remove one outer frame cross member 106 from being operatively connected to longitudinal outer frame parallel members 104. Longitudinal inner frame parallel members 110 of inner frame 108 may be operatively disconnected from outer frame cross member by removing one or more standoffs 114 from outer frame cross member 106. A bolted connection 109, as illustrated in FIG. 1A, of one outer frame cross member 106 may be removed to detach one outer frame cross member 106 from longitudinal outer frame parallel members 104. Tailgate 240 and bed 238 may still be used while vehicle rack 100 is in place and in use on vehicle 234.

Figure 3A:
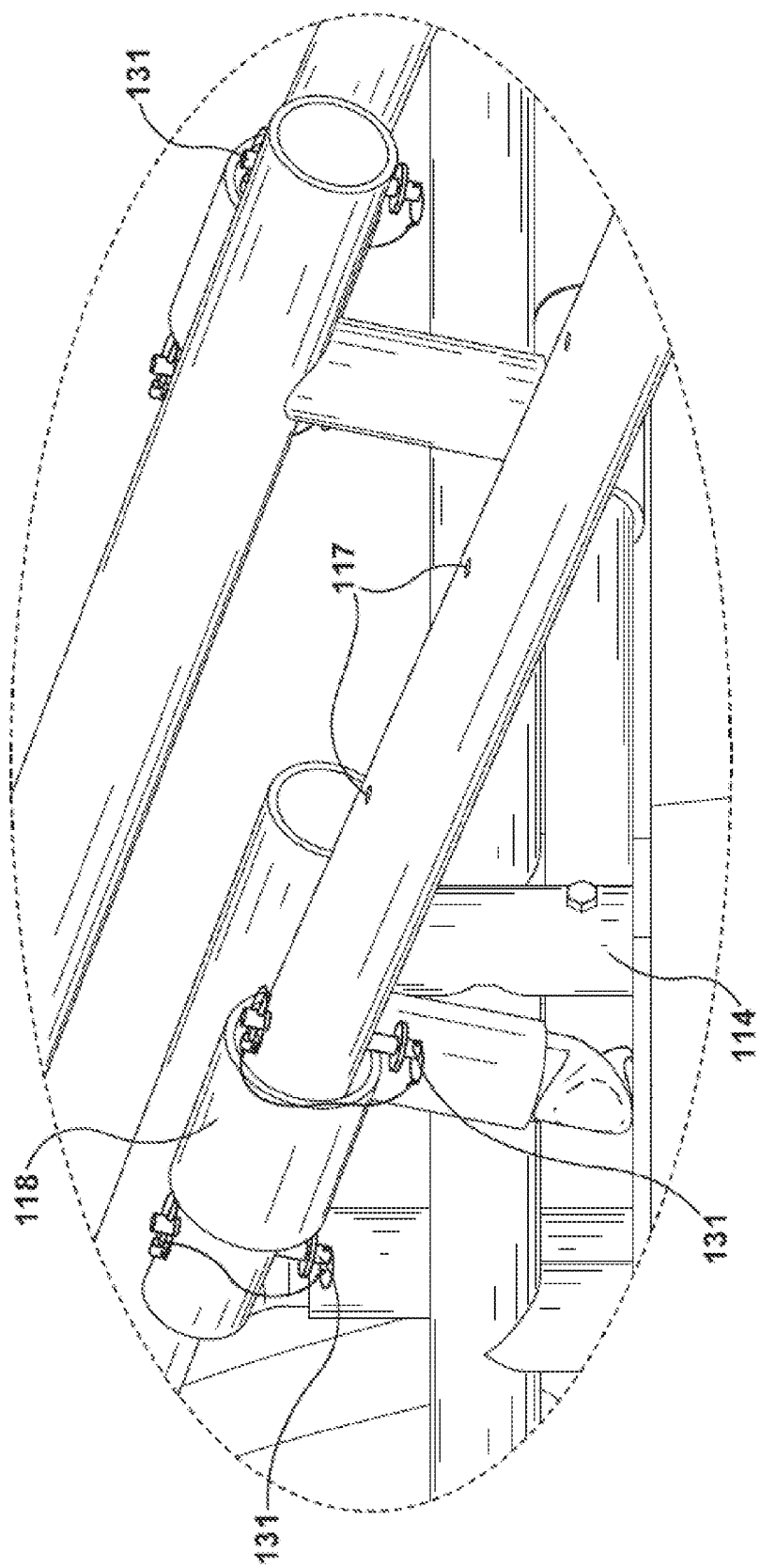
FIG. 3A illustrates certain portions of an example vehicle rack in greater detail.

Referring to FIG. 3, a perspective view of vehicle rack 100 with two inner frames 108 is illustrated, while FIG. 3A illustrates portions of vehicle rack 100 in greater detail. Vehicle rack 100 may be adjusted and modular components may be added to vehicle rack 100 based on a user's desired configuration. Vehicle rack may be configured in any way to convey one or more personal recreational vehicles, so long as vehicle height, width, and gross weight conform to local driving rules. In one embodiment, vehicle rack 100 is adjusted to conform to vehicle dimensions of a local jurisdiction. With reference to FIG. 3, distal end 116a of telescoping members 116 with dolly 120 is extended away from inner frames 108 with a proximate end 116b of telescoping members 116 secured to telescoping member guides 118 by a quick-connect hardware 131. Telescoping member guides 118 may have one or more apertures therethrough which may align with one or more apertures through proximal end 116b of telescoping members 116 to secure telescoping members 116 to telescoping member guides 118. Quick-connect hardware 131 may be detached and proximal end 116b of telescoping members 116 may be retracted back toward tensioning device 124 to stow telescoping members 116 and dolly 120. One or more apertures 117 in distal end 116a of telescoping members 116 may be aligned with apertures 117 of telescoping member guides 118 and a quick-connect hardware 131 may be inserted therethrough to secure telescoping members 116 and dolly 120 in a stowed position relative to inner frames 108. In one embodiment, inner frames 108 are equally spaced such that telescoping members 116 are stowed on one telescoping member guide 118 from separate inner frames 108 such that telescoping members 116 and dolly 120 are stored between each inner frame 108. In this embodiment, telescoping members 116 and dolly 120 may be stored between inner frames 108 to better distribute weight.

Height and angle of dolly 120 may be adjusted relative to distal end of telescoping members 116. In one embodiment, telescoping member guides 118 vary angles of telescoping members 116, and height and angle of dolly 120 are adjusted to provide firm contact with a ground or lake bottom so as to load and unload a personal recreation vehicle. In this embodiment, vehicle 234 loads and unloads a personal recreation vehicle directly from shore in lieu of using a boat launch or similar method. In one embodiment, dolly cross member 321 provides adjustability of dolly 120 such that width of dolly can be varied to accommodate width variations of inner frame 108. Width adjustability of dolly 120 may be accomplished by aforementioned adjustability techniques such as telescoping members, apertures, and quick connect hardware.

Various portions of vehicle rack 100 may telescope within another to provide adjustability and other functionality. For example, portion 126 of inner frame 108 may have a first width/diameter which may allow portion 126 to telescope within portion 128 having a second width/diameter larger than first width/diameter of portion 126. Portion 128 having a larger second width/diameter may be of a different material and used to cover portion 126. In one embodiment, portion 128 may be of a soft material such as a polymeric material and cover all or portion of portion 126 which may be of a metal material. Portion 128 may be used to protect personal recreational vehicle from scratching. Portion 128 may be easily replaced by sliding portion 128 of a larger, second width/diameter over portion 126 with a smaller first width/diameter. In one embodiment, portion 126 is a cylindrical tubular aluminum. In another embodiment, portions 128 and 126 are a square tubing.

Referring to FIG. 4, a perspective view of vehicle 234 with vehicle rack 100 carrying one or more personal recreational vehicles 442 is illustrated. Personal recreational vehicle 442 may be stored on longitudinal inner frame parallel members 110 of inner frame 108 to be transported, or personal recreational vehicle 442 may be unloaded from longitudinal inner frame parallel members 110 onto telescoping members 116 and supported by adjustable dolly 120 for launch into an environment such as a lake. Personal recreational vehicle 442 may be secured to longitudinal inner frame parallel members by an attachment hardware (not shown) such as an attachment strap or be secured to longitudinal inner frame parallel members 110 by a weight of personal recreational vehicle 442 and gravity.

Figure 5:
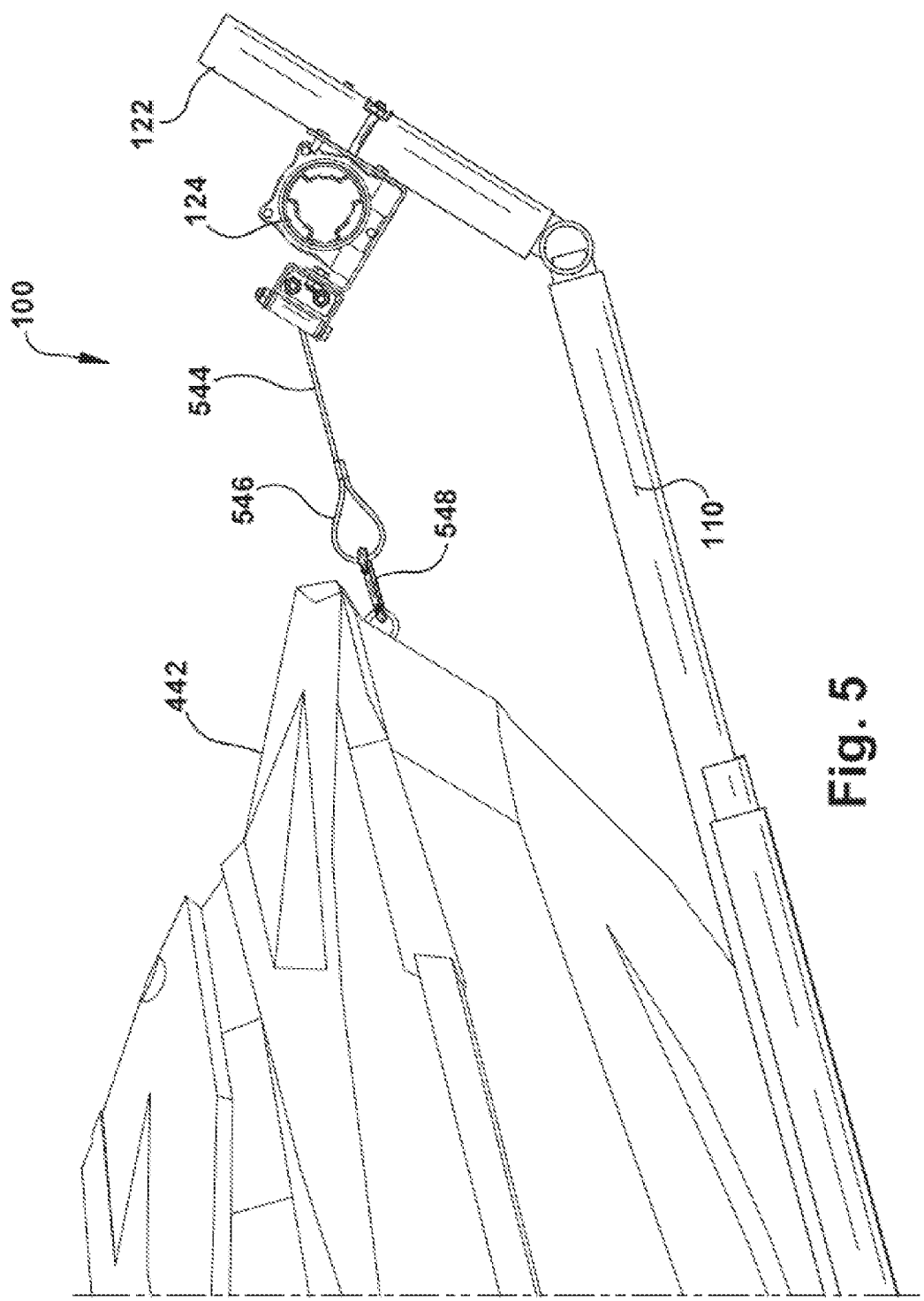
FIG. 5 illustrates a side view of an example vehicle rack with a tensioning device.

Referring now to FIG. 5, a side view of vehicle rack 100 and tensioning device 124 with its interconnection to personal recreational vehicle 442 is illustrated. Tensioning device 124, such as an electric winch, may tension or slacken one of a cable, rope, and chain 544 to load and unload personal recreational vehicle 442 to and from longitudinal inner frame parallel members 110 of inner frame 108. Cable, rope, chain 544 may have an attachment hardware 546 connected thereto for a quick connection to an attachment point 548 on personal recreational vehicle 442. In one embodiment, attachment hardware 546 is a carabiner or like hardware for attaching to a tow-loop attachment point 548 on personal recreational vehicle 442.

Figure 6:
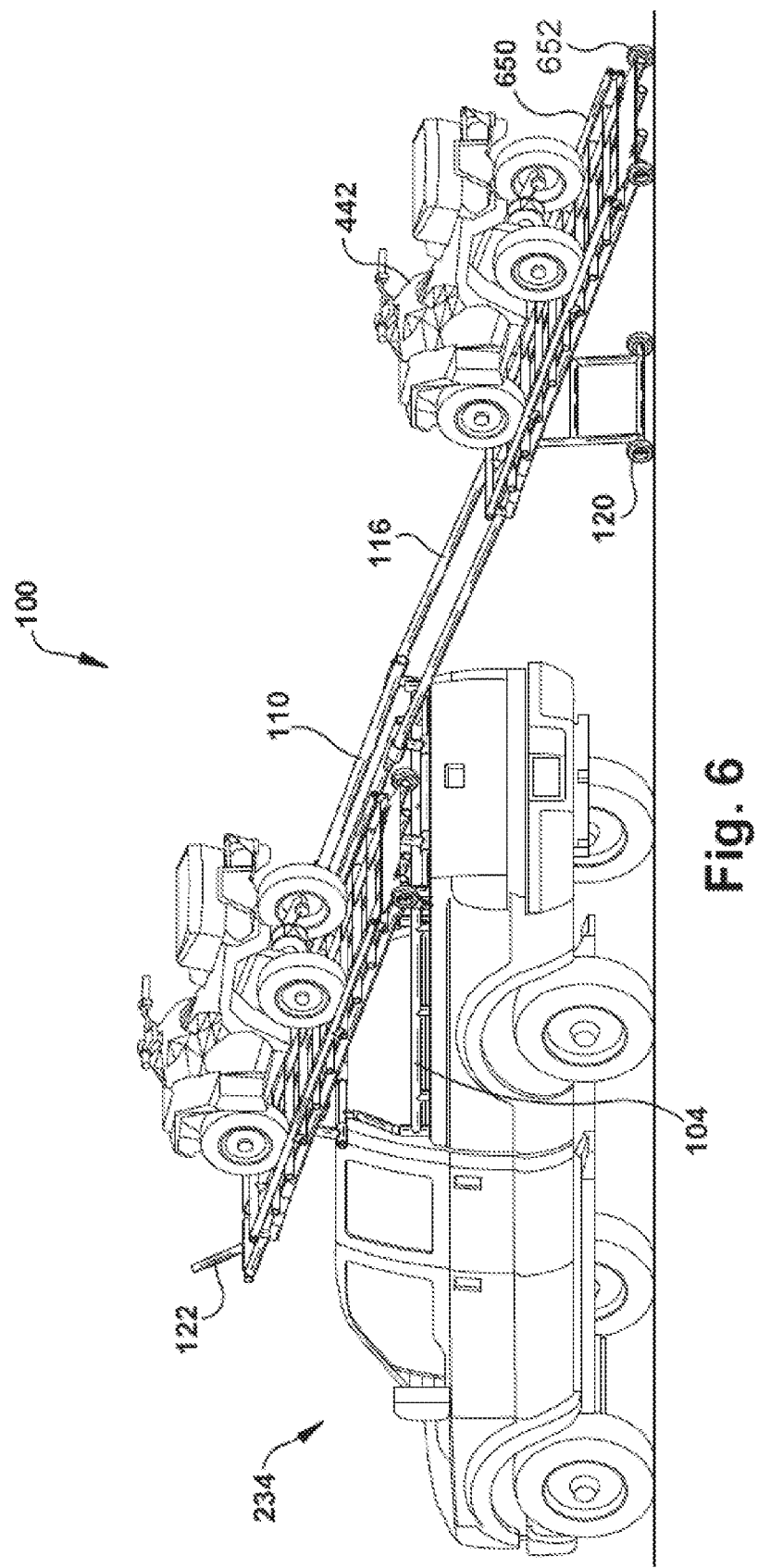
FIG. 6 illustrates a perspective view of an example vehicle rack with vehicle platforms mounted to a vehicle.

Referring now to FIG. 6, a perspective view of vehicle rack 100 attached to vehicle 234 is provided. In one embodiment, vehicle rack 100 is used to load, unload and transport a personal recreational vehicle 442 such as an ATV. In one embodiment, telescoping members 116 and longitudinal inner frame parallel members 110 interface with a geometry of personal recreational vehicle 442, such as a personal watercraft hull, to allow for direct loading and unloading to and from longitudinal inner frame parallel members 110 of inner frame 108. In another embodiment, personal recreational vehicles 442 are attached to platform 650 to be conveyed over telescoping members 116 and onto longitudinal inner frame parallel members 110 of inner frame 108 for storage and transport thereon. Platform 650 may have one or more attachment points (not shown) or attachment hardware thereon (not shown) for fixedly securing personal recreational vehicle 442 to platform 650. Platform 650 may utilize platform wheels 652 for ease of loading and unloading platform 650 to and from telescoping members 116. Platform 650 may have an attachment point (not shown) for attaching a rope, chain, or cable for use with tensioning device 124.

FIG. 7 is a flow chart of a method 700 for using vehicle rack 100 to load a personal recreational vehicle 442. In one embodiment, method 700 may include removing one or more quick-connect hardware from a distal end of each of two or more telescoping member guides to free two retracted telescoping members connected to at least one inner frame (710). Method 700 may include extending two telescoping members from the at least one inner frame (720). Method 700 may include securing a proximate end of the extended telescoping member to at least one telescoping member guide with the one or more quick-connect hardware (730). Method 700 may include securing at least one of a rope, chain, and cable to a personal recreational vehicle (740). Method 700 may include applying a tension with a tensioning device to the at least one of a rope, chain, and cable, such that the tension draws the personal recreational vehicle onto the two extended telescoping members and further onto the at least one inner frame (750). Method 700 may include removing the one or more quick-connect hardware from each of the at least one telescoping member guide to free the proximate end of each of the two extended telescoping members (760). Method 700 may include retracting the proximate end of each of the two extended telescoping members back toward the at least one inner frame (770). Method 700 may include re-securing the one or more quick-connect hardware to both of a distal end of telescoping members and telescoping member guides to secure telescoping members relative to the inner frame (780).

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

The invention claimed is:

1. A vehicle rack for conveying a personal vehicle, comprising:
    an outer frame, the outer frame operable to mount to a bed side rail of a vehicle, the outer frame comprising two longitudinal outer frame parallel members, the two longitudinal outer frame parallel members joined by at least one outer frame cross member;
    at least one inner frame, the at least one inner frame operatively connected to the at least one outer frame cross member, the at least one inner frame comprising two longitudinal inner frame parallel members, the two longitudinal inner frame parallel members joined by at least one inner frame cross member;

two telescoping members, each telescoping member operatively connected to a longitudinal inner frame parallel member, the two telescoping members operable to extend from and retract to the two longitudinal inner frame parallel members, such that when extended, the two telescoping members form a substantially parallel rail operable to convey an item for storage on the inner frame; and at least two telescoping member guides, the at least two telescoping member guides each operatively connected to each of the two longitudinal inner frame parallel members, the at least two telescoping member guides operable to guide and retain each of the two telescoping members, the at least two telescoping member guides further operable to adjust an angle of each of the two telescoping members, wherein the vehicle rack is mountable to the bed side rail of the vehicle such that the vehicle rack is clear of a tailgate and a bed of the vehicle effective to permit one or more of:
  use of the tailgate and the bed of the vehicle while the vehicle rack is mounted; and
  use of a trailer attached to the vehicle without interference from the personal recreational vehicle loaded on the vehicle rack; and wherein each of the two telescoping members is selectively removable from the at least one inner frame, each of the two telescoping members further comprising a distal end portion and a proximal end portion, the distal end portion operable to telescope away from the at least one inner frame and the proximal end portion operable to remain operatively connected to the at least one inner frame, wherein the distal end portions are operatively connected by a wheeled dolly, and wherein:

a height and angle of the wheeled dolly is adjustable; and
the two telescoping members, together with the wheeled dolly, are selectively mountable to the at least one inner frame to place the wheeled dolly in a wheels-down orientation or a wheels-up orientation.

2. The vehicle rack of claim 1, wherein the at least one outer frame cross member is adjustable in three dimensional space relative to the two longitudinal outer frame parallel members to vary at least one of a length, a height, and a depth of the at least one outer frame cross member relative to the two longitudinal outer frame parallel members.

3. The vehicle rack of claim 1, wherein the outer frame comprises one or more sockets, the one or more sockets operable to receive a vertical member, the vertical member operatively connected to the at least one outer frame cross member to vary the height of the at least one outer frame cross member relative to the two longitudinal outer frame parallel members.

4. The vehicle rack of claim 1, wherein:
the vehicle rack is of a tubular metal; and
portions of the tubular metal vehicle rack are of a first width and diameter and sized to fit within other portions of the tubular metal vehicle rack of a second width and diameter, such that portions of the first width telescope relative to portions of the second width to adjust the vehicle rack.

5. The vehicle rack of claim 4, wherein portions of the tubular metal vehicle rack of a second width and diameter are operable to telescope from and be secured relative to portions of the tubular metal vehicle rack of a first width and diameter by one or more quick-connect hardware, so as to provide a three space adjustment for the vehicle rack.

6. The vehicle rack of claim 5, wherein one or more apertures traversing the tubular metal portions of a second width and diameter correspond to one or more apertures traversing the tubular metal portions of a first width and diameter, such that the tubular metal portions of a second width and diameter can be adjusted relative to and secured to the tubular metal portions of a first width by aligning the one or more apertures traversing the tubular metal portions of a second width and diameter with the one or more apertures traversing the tubular metal portions of a first width and diameter and securing the quick-connect hardware through the aligned apertures.

7. The vehicle rack of claim 4, wherein the inner frame of a first width and diameter are of a tubular metal and a portion of the inner frame of a second width and diameter are of a polymeric, non-scratch material covering portions of the tubular metal of the first width and diameter.

8. The vehicle rack of claim 1, wherein the two telescoping members are secured by the at least two telescoping member guides of the at least one inner frame, or by one telescoping member guide of a first inner frame and by one telescoping member guide of a second inner frame.

9. The vehicle rack of claim 1, wherein a portion of the at least one inner frame comprises a mount for a tensioning device, and the tensioning device is a powered winch operable by a remote control.

10. The vehicle rack of claim 1, further comprising a platform operatively connected to the two telescoping members, such that an item connected to the platform may be conveyed via the two telescoping members for storage and retention on the at least one inner frame.

11. The vehicle rack of claim 1, wherein each of the two telescoping members is secured to at least one telescoping member guide by a quick-connect hardware.

12. The vehicle rack of claim 1, a portion of the vehicle rack other than the two longitudinal outer frame parallel members being selectively removable from the two longitudinal outer frame parallel members according to disconnection of one or more of:
  at least one removable vertical member coupled to one or more sockets that together operatively couple the at least one outer frame cross member to the two longitudinal outer frame parallel members;
  one or more removable standoffs that operatively couple the at least one outer frame cross member to the longitudinal inner frame parallel members; and
  a bolted connection between one outer frame cross member and the longitudinal inner frame parallel members.

13. The vehicle rack of claim 12, further comprising quick-connect hardware, the portion of the vehicle rack being selectively removable from the two longitudinal outer frame parallel members according to disconnection of the quick-connect hardware, the quick-connect hardware configured to couple or more of:
  one or more of: the at least one removable vertical member, the one or more sockets, the at least one outer frame cross member, and the two longitudinal outer frame parallel members; and
  the at least one outer frame cross member, the longitudinal inner frame parallel members, and the one or more removable standoffs.

14. A vehicle rack, comprising:
an outer frame operable to mount to a bed side rail of a vehicle, the outer frame comprising two longitudinal outer frame parallel members, the two longitudinal outer frame parallel members joined by at least one outer frame cross member, the at least one outer frame cross member adjustable in three dimensional space relative to the two longitudinal outer frame parallel members to vary at least one of a length, a height, and a depth of the at least one outer frame cross member relative to the two longitudinal outer frame parallel members;

at least one inner frame, the at least one inner frame operatively connected to the at least one outer frame cross member by at least one adjustable inner frame standoff, the at least one inner frame comprising two longitudinal inner frame parallel members, the two longitudinal inner frame parallel members joined by at least one inner frame cross member;

two telescoping members, each telescoping member operatively connected to a longitudinal inner frame parallel member, the two telescoping members operable to extend from and retract to the two longitudinal inner frame parallel members, such that when extended, the two telescoping members form a substantially parallel rail operable to convey an item for storage on the inner frame; and at least two telescoping member guides, the at least two telescoping member guides each operatively connected to each of the two longitudinal inner frame parallel members, the at least two telescoping member guides operable to guide and retain each of the two telescoping members, the at least two telescoping member guides further operable to adjust an angle of each of the two telescoping members, wherein the vehicle rack is mountable to the bed side rail of the vehicle such that the vehicle rack is clear of a tailgate and a bed of the vehicle effective to permit one or more of:

use of the tailgate and the bed of the vehicle while the vehicle rack is mounted; and use of a trailer attached to the vehicle without interference from a personal recreational vehicle loaded on the vehicle rack; and wherein a portion of the vehicle rack other than the two longitudinal outer frame parallel members being selectively removable from the two longitudinal outer frame parallel members according to disconnection of one or more of:

at least one removable vertical member coupled to one or more sockets that together operatively couple the at least one outer frame cross member to the two longitudinal outer frame parallel members, the at least one removable vertical member being coupled to one or more sockets via quick-connect hardware;

one or more removable standoffs that operatively couple the at least one outer frame cross member to the longitudinal inner frame parallel members, the one or more removable standoffs being operatively coupled to the at least one outer frame cross member and/or the longitudinal inner frame parallel members via quick-connect hardware; and a bolted connection between one outer frame cross member and the longitudinal inner frame parallel members.

15. The vehicle rack of claim 14, wherein:
the vehicle rack is of a tubular metal; and
portions of the tubular metal vehicle rack are of a first width and diameter and sized to fit within other portions of the tubular metal frame of a second width and diameter, such that portions of the first width telescope relative to portions of the second width to adjust the vehicle rack.

16. The vehicle rack of claim 14, wherein portions of the tubular metal frame of a second width and diameter are operable to telescope from and be secured relative to portions of the tubular metal frame of a first width and diameter by one or more quick-connect hardware, so as to provide a three space adjustment for the vehicle rack.

17. The vehicle rack of claim 14, a portion of the vehicle rack other than the two longitudinal outer frame parallel members being selectively removable from the two longitudinal outer frame parallel members according to disconnection of one or more of:

at least one removable vertical member coupled to one or more sockets that together operatively couple the at least one outer frame cross member to the two longitudinal outer frame parallel members, the at least one removable vertical member being coupled to one or more sockets via quick-connect hardware;

one or more removable standoffs that operatively couple the at least one outer frame cross member to the longitudinal inner frame parallel members, the one or more removable standoffs being operatively coupled to the at least one outer frame cross member and/or the longitudinal inner frame parallel members via quick-connect hardware; and a bolted connection between one outer frame cross member and the longitudinal inner frame parallel members.

18. A method for using a vehicle rack mounted to a vehicle, comprising:
the vehicle rack including:
an outer frame operable to mount to a bed side rail of a vehicle, the outer frame comprising two longitudinal outer frame parallel members, the two longitudinal outer frame parallel members joined by at least one outer frame cross member;

at least one inner frame, the at least one inner frame operatively connected to the at least one outer frame cross member by at least one adjustable inner frame standoff, the at least one inner frame comprising two longitudinal inner frame parallel members, the two longitudinal inner frame parallel members joined by at least one inner frame cross member;

two telescoping members, each telescoping member operatively connected to a longitudinal inner frame parallel member, the two telescoping members operable to extend from and retract to the two longitudinal inner frame parallel members, such that when extended, the two telescoping members form a substantially parallel rail operable to convey an item for storage on the inner frame; and at least two telescoping member guides, the at least two telescoping member guides each operatively connected to each of the two longitudinal inner frame parallel members, the at least two telescoping member guides operable to guide and retain each of the two telescoping members, the at least two telescoping member guides further operable to adjust an angle of each of the two telescoping members;

mounting the vehicle rack to a bed side rail of the vehicle such that the vehicle rack is clear of a tailgate and the bed of the vehicle effective to permit one or more of:

use of the tailgate and the bed of the vehicle while the vehicle rack is mounted; and use of a trailer attached to the vehicle without interference from a personal recreational vehicle loaded on the vehicle rack;

adjusting the at least one outer frame cross member in three dimensional space relative to the two longitudinal outer frame parallel members to vary at least one of a length, a height, and a depth of the at least one outer frame cross member relative to the two longitudinal outer frame parallel members; removing one or more quick-connect hardware from a distal end of each of two or more telescoping member guides to free two retracted telescoping members connected to the at least one inner frame;

extending two telescoping members from the at least one inner frame;

securing a proximate end of the extended telescoping member to at least one telescoping member guide with the one or more quick-connect hardware;

securing at least one of a rope, chain, and cable to a personal recreational vehicle; applying a tension with a tensioning device to the at least one of a rope, chain, and cable, such that the tension draws the personal recreational vehicle onto the two extended telescoping members and further onto the at least one inner frame;

removing the one or more quick-connect hardware from each of the at least one telescoping member guides to free the proximate end of each of the two extended telescoping members; and retracting the proximate end of each of the two extended telescoping members back toward the at least one inner frame; and re-securing the one or more quick-connect hardware to both of a distal end of telescoping members and telescoping member guides to secure telescoping members relative to the at least one inner frame.

\* \* \* \* \*

UNITED STATES PATENT AND TRADEMARK OFFICE
CERTIFICATE OF CORRECTION

PATENT NO. : 10,160,371 B2  
APPLICATION NO. : 15/454943  
DATED : December 25, 2018  
INVENTOR(S) : Richard J. Frost Page 1 of 1

It is certified that error appears in the above-identified patent and that said Letters Patent is hereby corrected as shown below:

On the Title Page

Item (73) Assignee: please delete "Cleveland, OH (US)" and insert --Millarville, AB, Canada--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*